US012001165B2

(12) United States Patent
Iwase

(10) Patent No.: US 12,001,165 B2
(45) Date of Patent: Jun. 4, 2024

(54) IMAGE FORMING APPARATUS HAVING MEMBER TO RESTRICT DISENGAGEMENT OF A DETACHABLE CARTRIDGE

(71) Applicant: Canon Kabushiki Kaisha, Tokyo (JP)

(72) Inventor: Masaki Iwase, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/970,770

(22) Filed: Oct. 21, 2022

(65) Prior Publication Data

US 2023/0125991 A1 Apr. 27, 2023

(30) Foreign Application Priority Data

Oct. 22, 2021 (JP) ................................ 2021-172826

(51) Int. Cl.
*G03G 21/18* (2006.01)
*G03G 21/16* (2006.01)

(52) U.S. Cl.
CPC ....... *G03G 21/185* (2013.01); *G03G 21/1647* (2013.01); *G03G 21/1676* (2013.01); *G03G 2221/1654* (2013.01)

(58) Field of Classification Search
CPC ........... G03G 15/0875; G03G 21/1647; G03G 21/1676; G03G 21/185; G03G 2221/1654
See application file for complete search history.

(56) References Cited

U.S. PATENT DOCUMENTS

| | | | | |
|---|---|---|---|---|
| 2005/0191090 | A1 | 9/2005 | Nishimura | G03G 21/18 |
| 2008/0080902 | A1* | 4/2008 | Saito | G03G 15/0875 399/262 |
| 2010/0254728 | A1 | 10/2010 | Iwase et al. | G03G 15/16 |
| 2010/0272452 | A1 | 10/2010 | Tsukijima | G03G 15/00 |
| 2017/0293253 | A1 | 10/2017 | Iwase | G03G 21/00 |
| 2018/0164725 | A1* | 6/2018 | Takahashi | G03G 21/1676 |

(Continued)

FOREIGN PATENT DOCUMENTS

| | | |
|---|---|---|
| JP | 2003-280309 | 10/2003 |
| JP | 2003-280309 A | 10/2003 |
| JP | 2005-242067 | 9/2005 |

(Continued)

*Primary Examiner* — Sophia S Chen
(74) *Attorney, Agent, or Firm* — Venable LLP

(57) ABSTRACT

An image forming apparatus includes a cartridge including a portion-to-be-engaged; a main assembly to which the cartridge is detachably mountable; and an operating portion configured to be operated when the cartridge is disengaged from the main assembly. The main assembly includes a cartridge disengagement restricting mechanism configured to restrict disengagement of the cartridge, the cartridge disengagement restricting mechanism comprises an engaging portion for engaging with the portion-to-be-engaged of the cartridge so as to restrict movement of the cartridge in a disengaging direction in which the cartridge is disengaged from the main assembly; a restricting portion movable between a first position where a releasing operation of the operating portion for releasing engagement between the portion-to-be-engaged and the engaging portion and a second position where the releasing operation is permitted; and an actuator configured to move the restricting portion between the first position and the second position.

17 Claims, 16 Drawing Sheets

(56) References Cited

U.S. PATENT DOCUMENTS

| | | | | |
|---|---|---|---|---|
| 2019/0265636 | A1 | 8/2019 | Teshima et al. | G03G 21/16 |
| 2021/0191309 | A1* | 6/2021 | Tanio | G03G 21/1676 |

FOREIGN PATENT DOCUMENTS

| | | | | |
|---|---|---|---|---|
| JP | 2005-242067 A | | 9/2005 | |
| JP | 2010-256557 | | 11/2010 | |
| JP | 2010-256557 A | | 11/2010 | |
| JP | 2019-148756 | | 9/2019 | |
| JP | 2019-148756 A | | 9/2019 | |
| JP | 2020-115161 | | 7/2020 | |
| JP | 2020-115161 A | | 7/2020 | |
| WO | WO-2019231059 A1 | * | 12/2019 | G03G 21/1676 |

* cited by examiner (a)

(b)

IMAGE FORMING APPARATUS HAVING MEMBER TO RESTRICT DISENGAGEMENT OF A DETACHABLE CARTRIDGE

FIELD OF THE INVENTION AND RELATED ART

The present invention relates to an image forming apparatus forming an image on a recording material.

In the image forming apparatus such as a printer, a copying machine, or a multi-function machine, a toner cartridge for supplying toner (developer) is detachably mounted. In the case where a remaining amount of the toner in the cartridge becomes small, a cartridge exchange is made by a user or a service person.

Japanese Laid-Open Patent Application (JP-A) 2020-115161 discloses that excessively early exchange of a toner cartridge by restricting access to the toner cartridge by locking an openable cover of an image forming apparatus main assembly in the case where toner in a predetermined amount or more remains in the cartridge.

JP-A 2010-256557 discloses that an openable door is provided at a dismounting opening of each of a plurality of toner cartridges and that for only the toner cartridge in which a remaining toner amount becomes less that a predetermined amount, cartridge exchange is made enable by releasing lock of a corresponding door.

However, in the above-described constitutions, in order to restrict dismounting of the toner cartridge, there is a need to provide the openable door for covering the toner cartridge, a mechanism for locking this door, and a sensor or the like for checking open/close of the door.

SUMMARY OF THE INVENTION

According to an aspect of the present invention, there is provided an image forming apparatus comprising: a cartridge including a portion-to-be-engaged; a main assembly to which the cartridge is detachably mountable; and an operating portion configured to be operated when the cartridge is disengaged from the main assembly, wherein the main assembly includes a cartridge disengagement restricting mechanism configured to restrict disengagement of the cartridge, the cartridge disengagement restricting mechanism comprising: an engaging portion configured to engage with the portion-to-be-engaged of the cartridge so as to restrict movement of the cartridge in a disengaging direction in which the cartridge is disengaged from the main assembly; a restricting portion movable between a first position where a releasing operation of the operating portion for releasing engagement between the portion-to-be-engaged and the engaging portion is restricted and a second position where the releasing operation is permitted; and an actuator configured to move the restricting portion between the first position and the second position.

Further features of the present invention will become apparent from the following description of exemplary embodiments with reference to the attached drawings.

Figure 3:
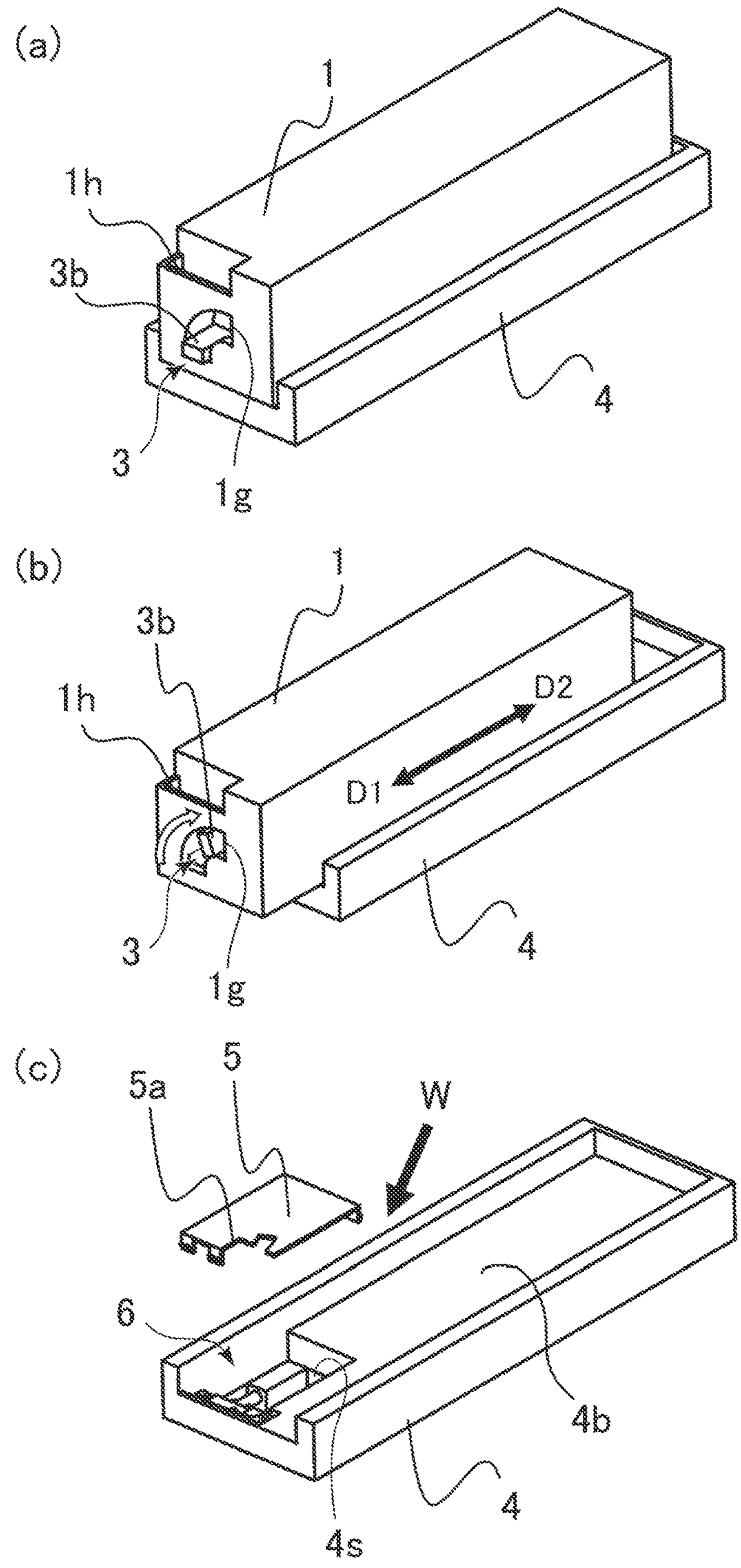

Parts (a), (b) and (c) of FIG. 3 are perspective views of a cartridge mounting portion in the embodiment 1.

Figure 4:
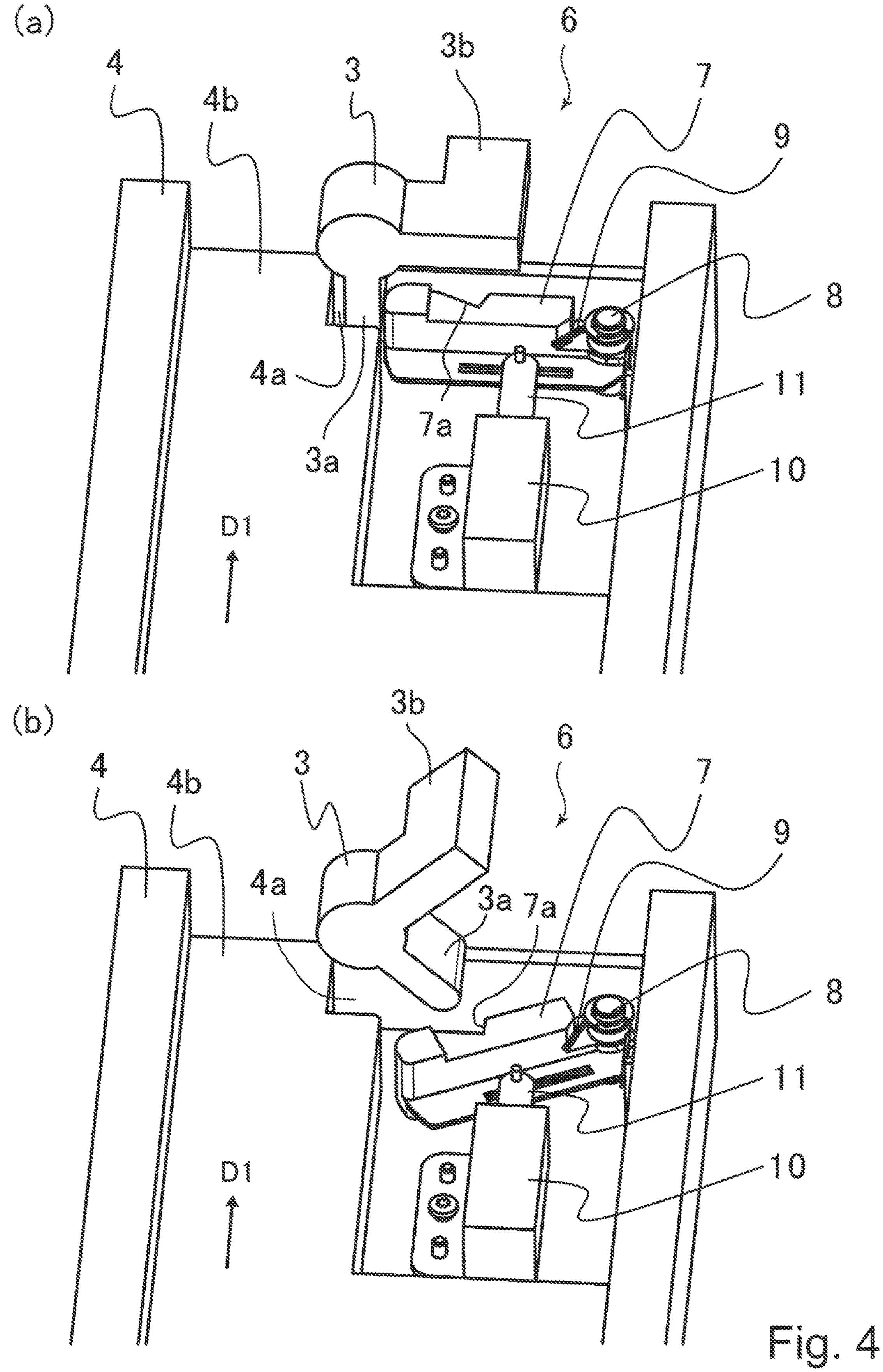

Parts (a) and (b) of FIG. 4 are perspective views of a locking mechanism in the embodiment 1.

Figure 5:
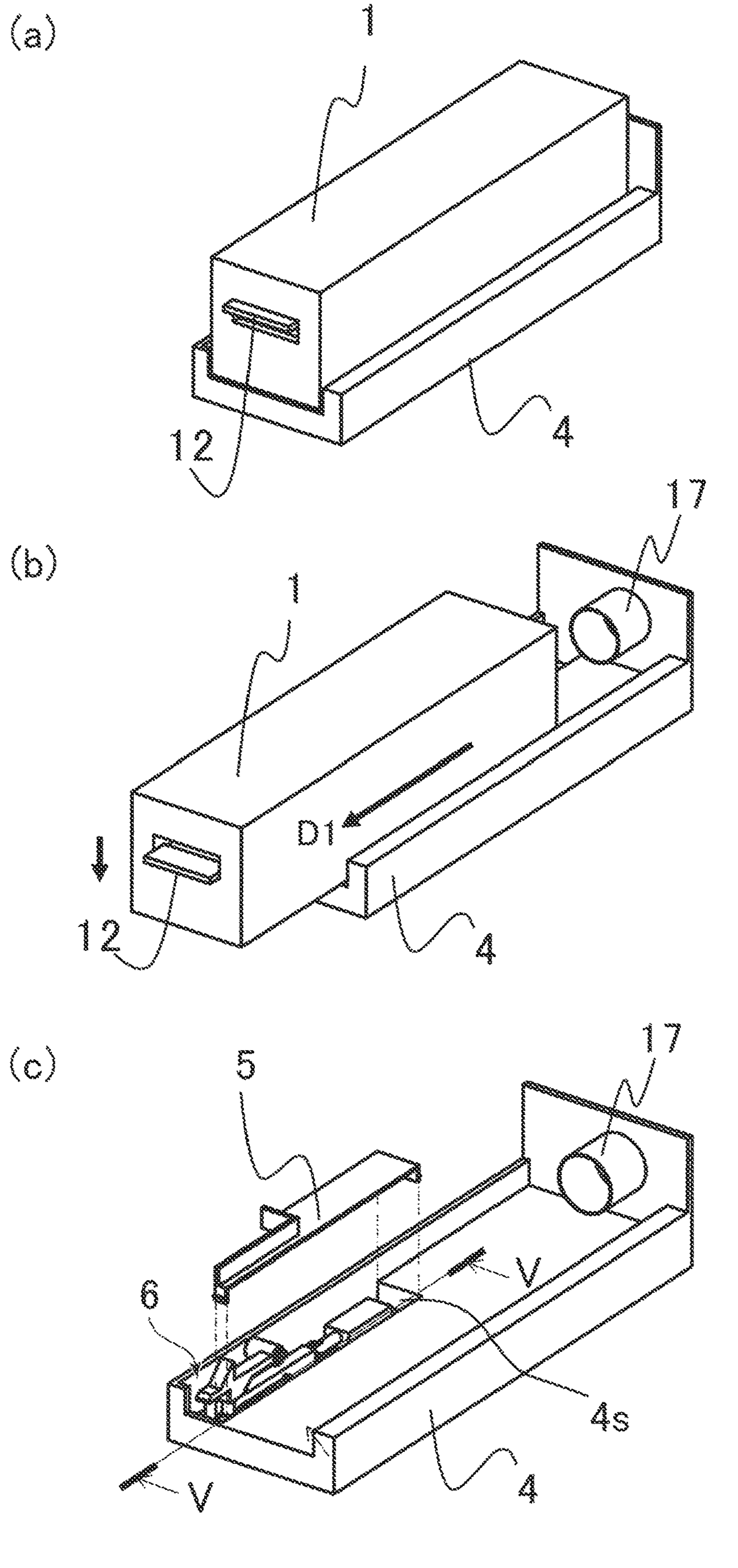

Parts (a), (b) and (c) of FIG. 5 are perspective views of a contact mounting portion in an embodiment 2.

Figure 6:
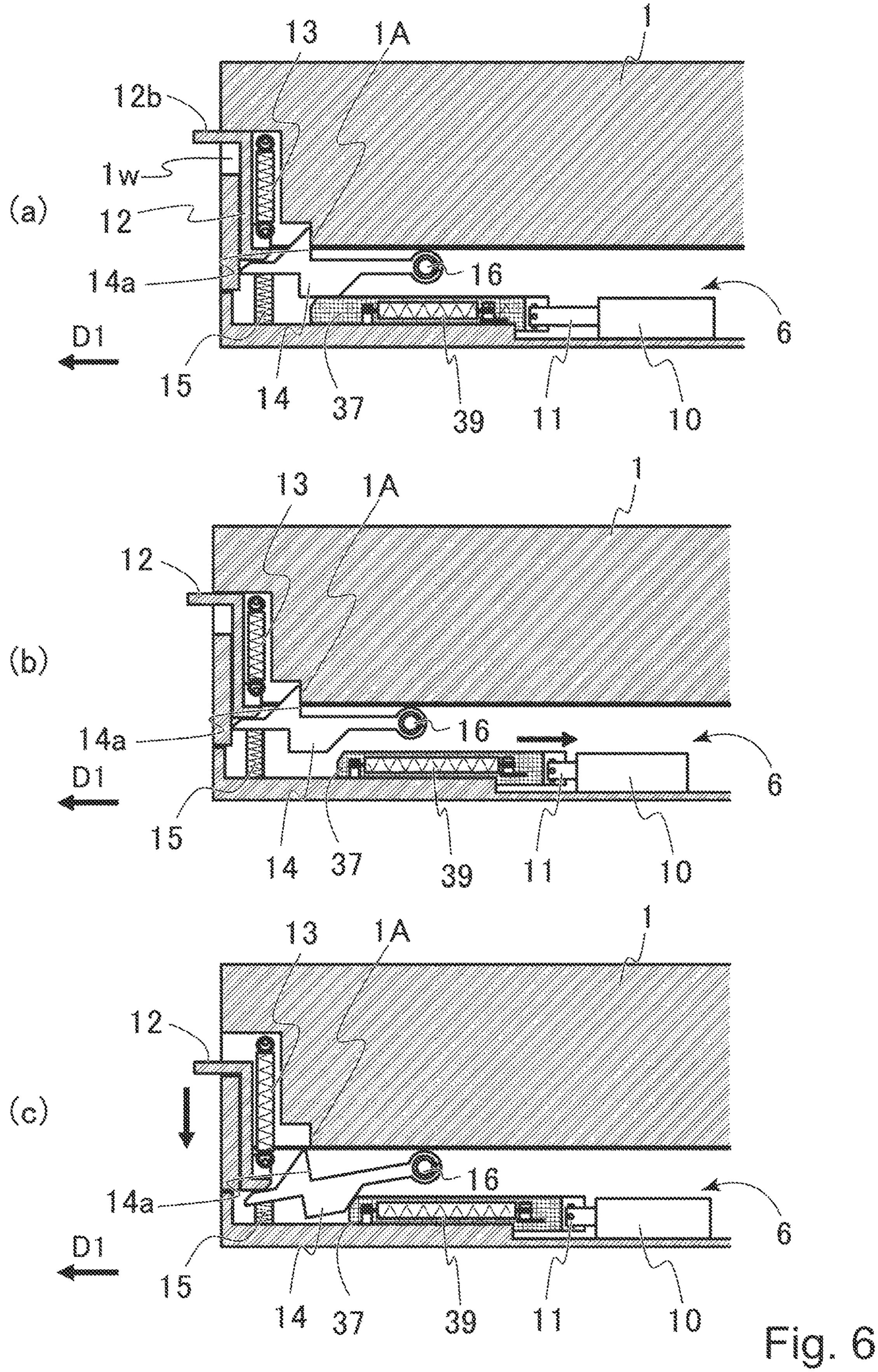

Parts (a), (b) and (c) of FIG. 6 are sectional views of the locking mechanism in the embodiment 2.

Figure 7:
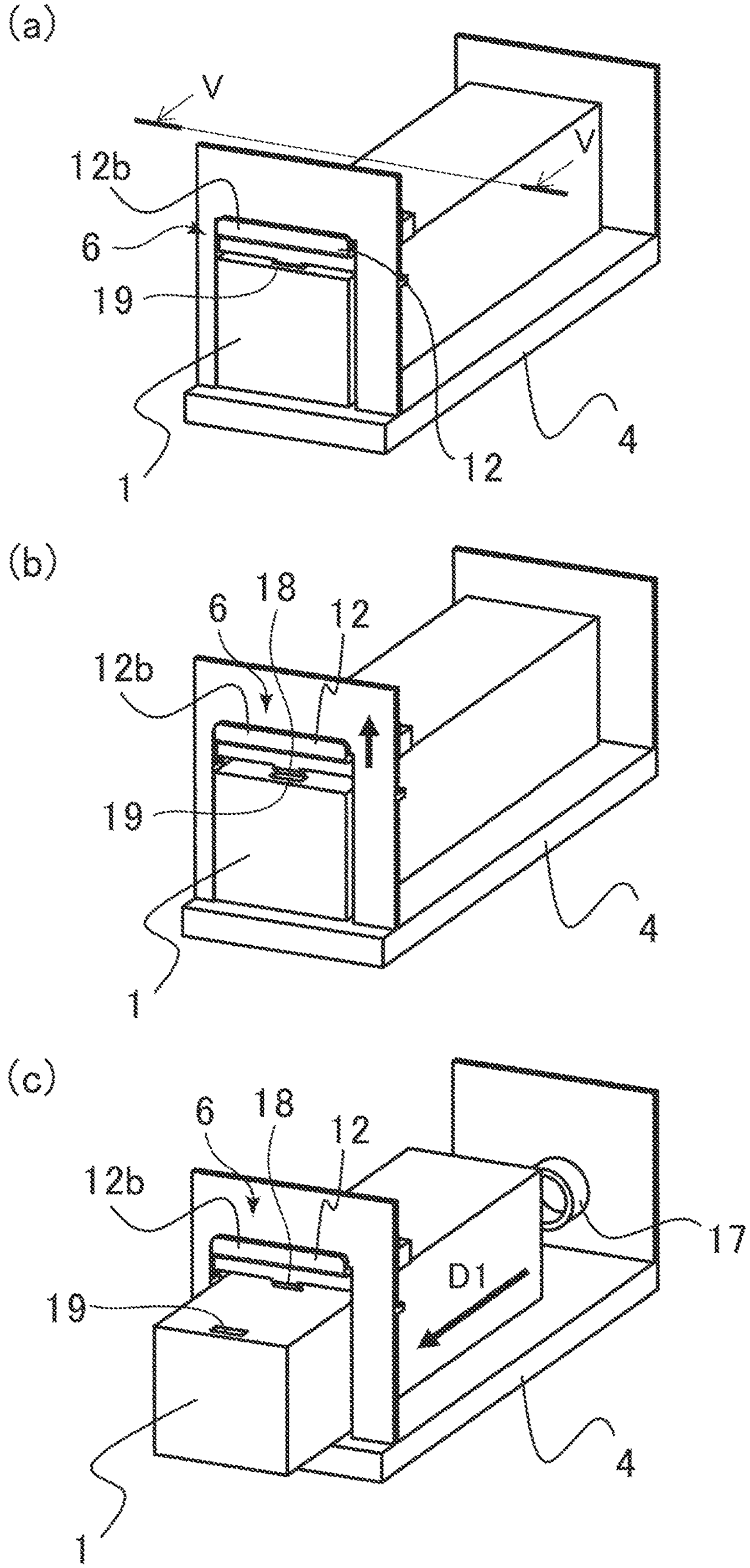

Parts (a), (b) and (c) of FIG. 7 are perspective views of a contact mounting portion in an embodiment 3.

Figure 8:
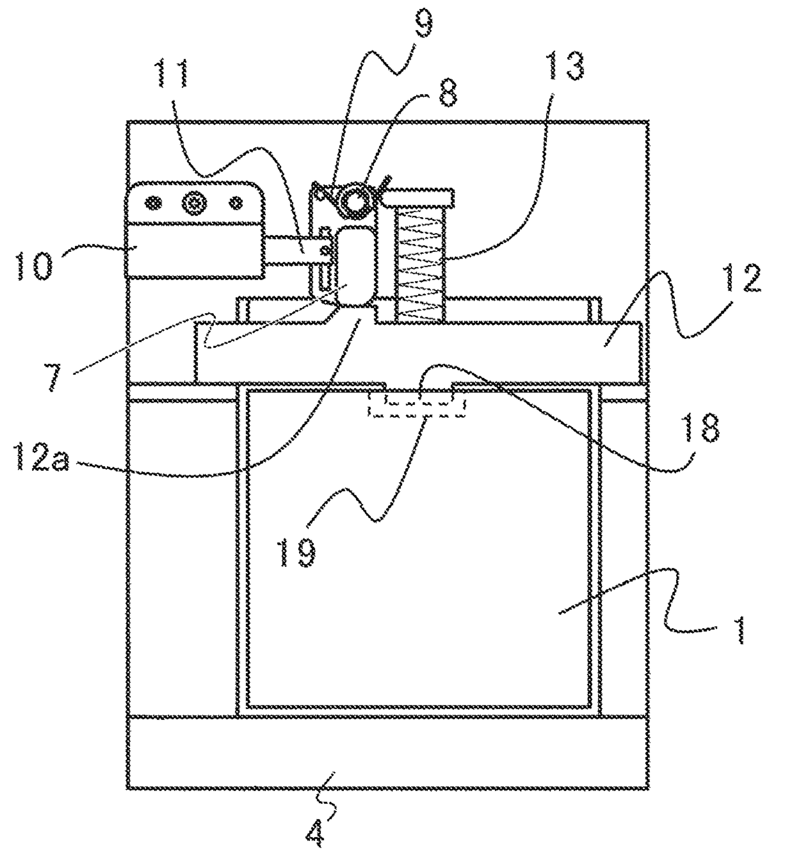
Figure 8:
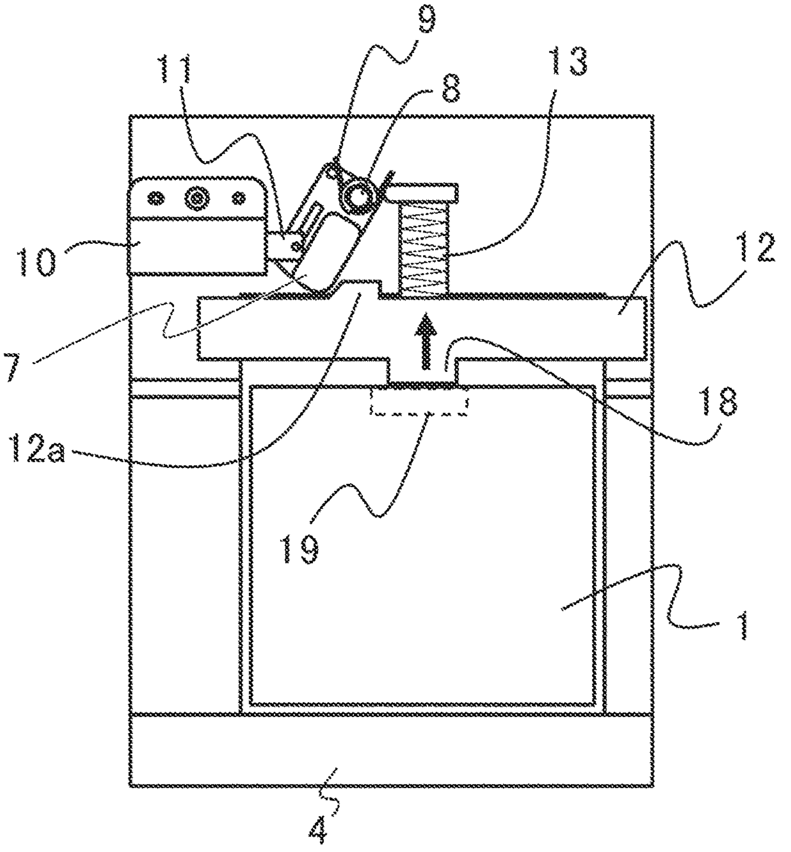

Parts (a) and (b) of FIG. 8 are sectional views of a locking mechanism in the embodiment 3.

Figure 9:
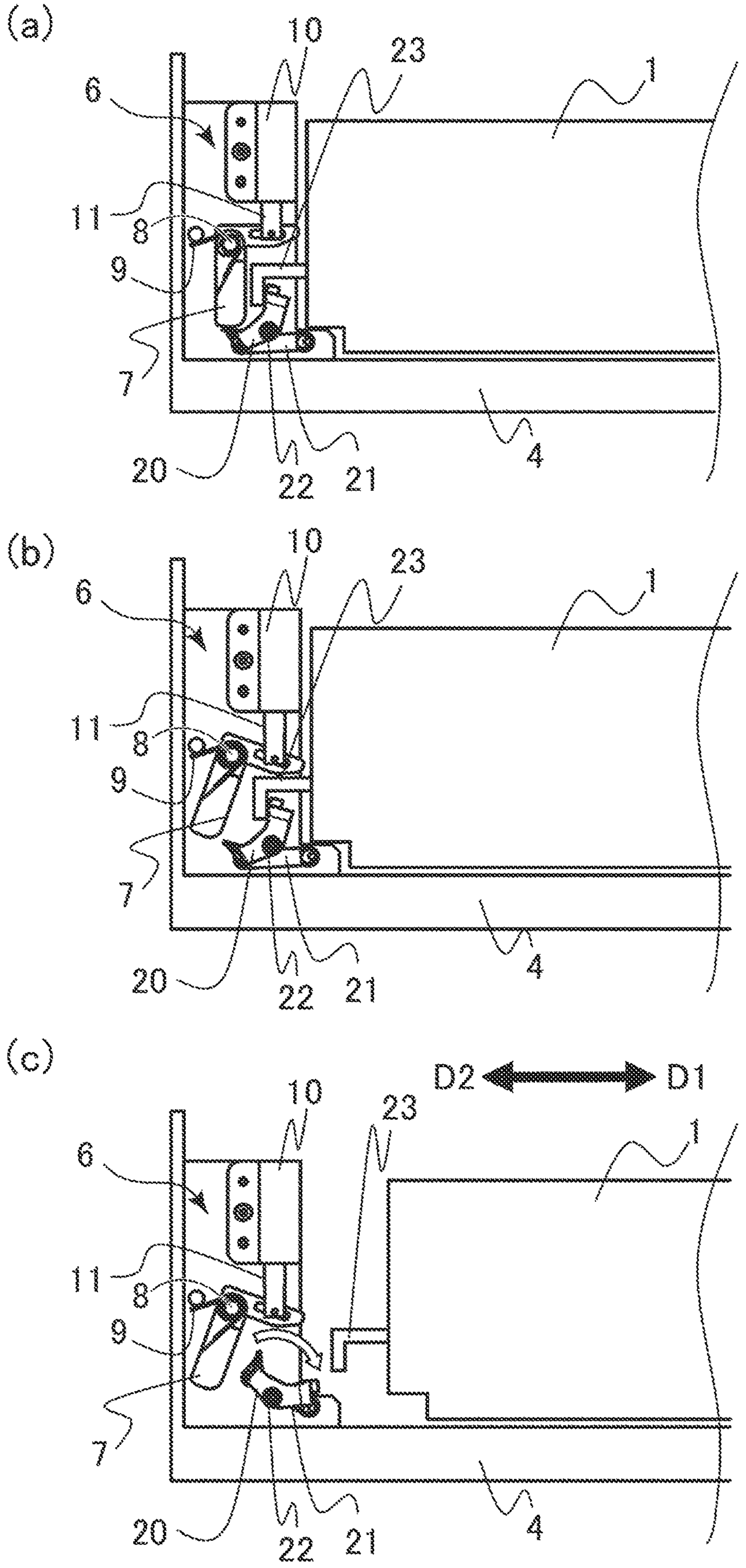

Parts (a), (b) and (c) of FIG. 9 are sectional views of a locking mechanism in an embodiment 4.

Figure 10:
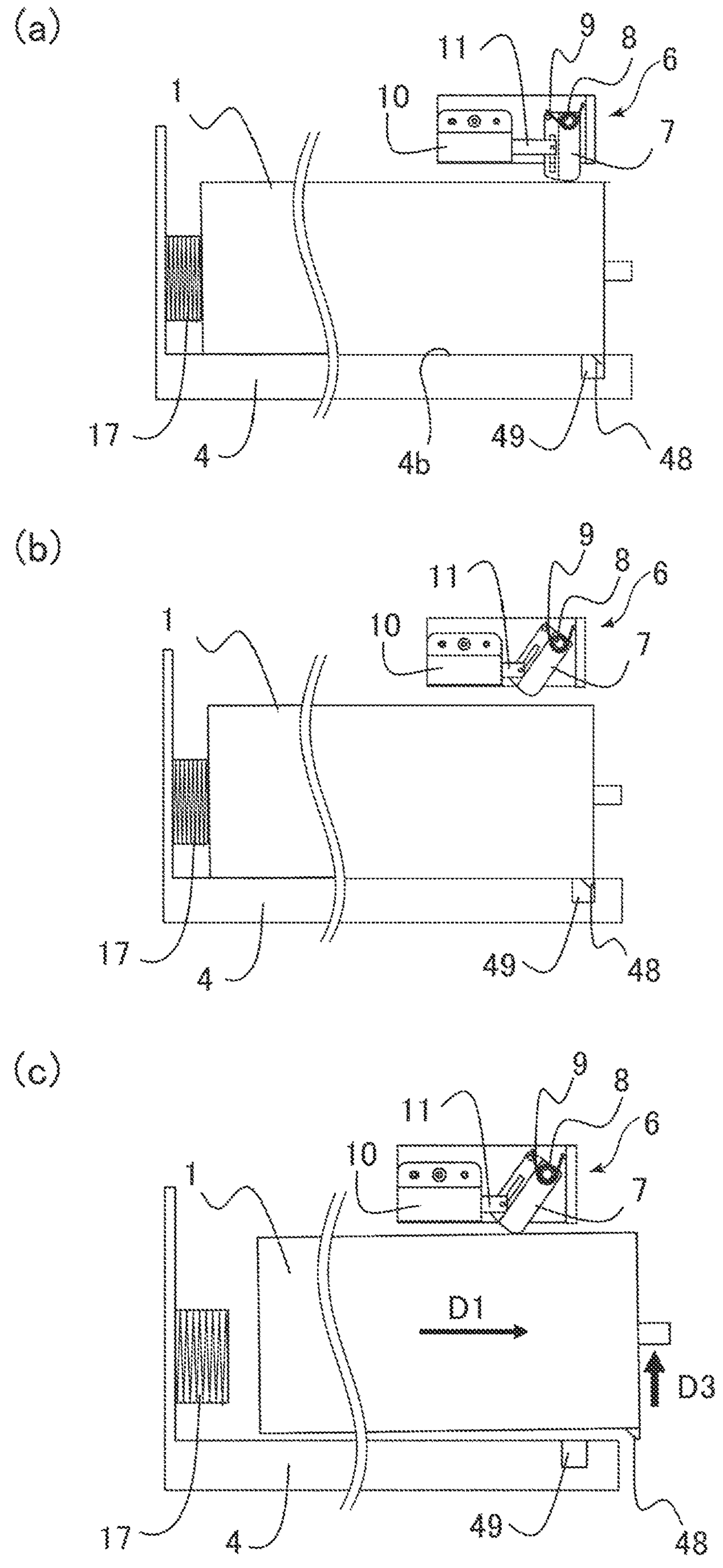

Parts (a), (b) and (c) of FIG. 10 are sectional views of a locking mechanism in an embodiment 5.

Figure 11:
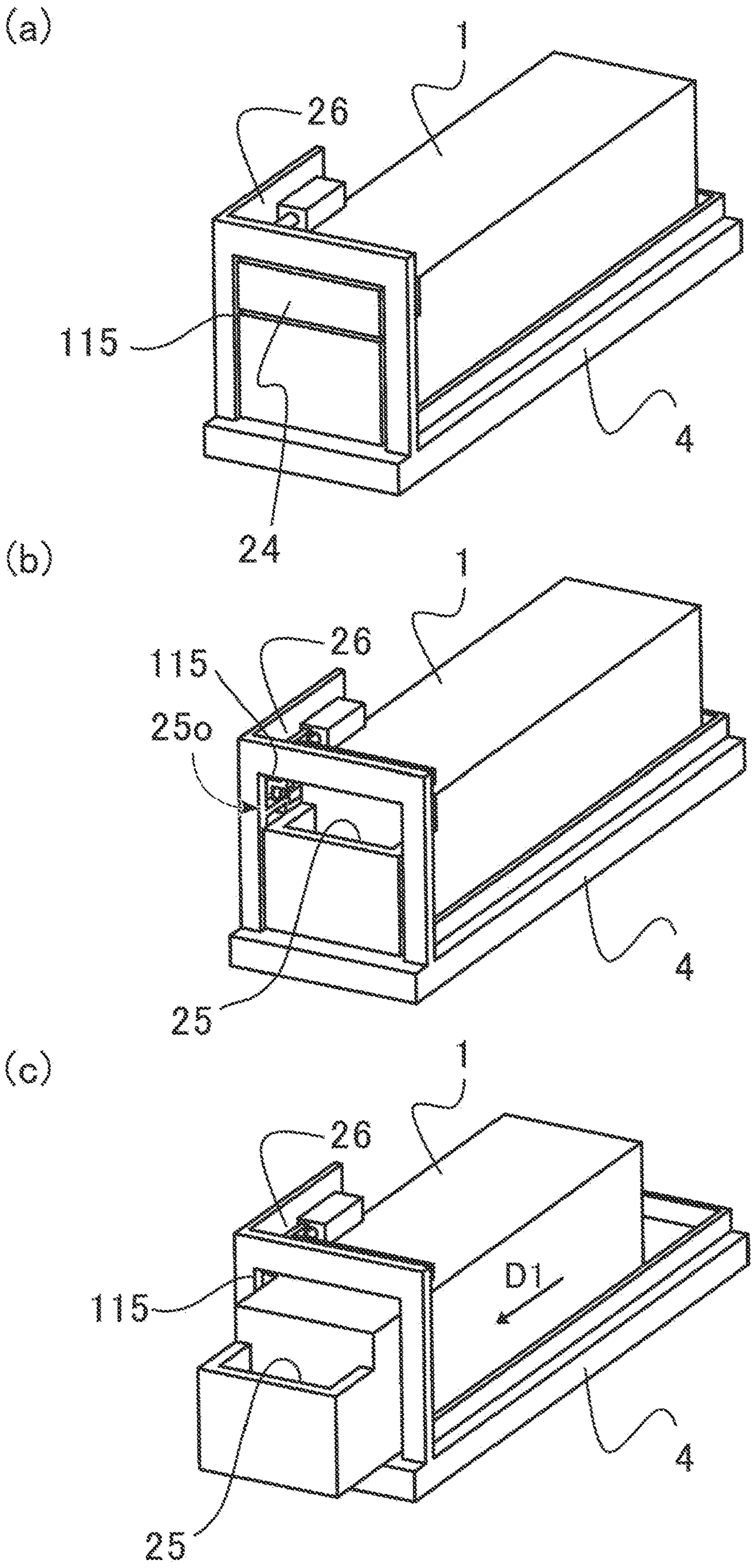

Parts (a), (b) and (c) of FIG. 11 are perspective views of a cartridge mounting portion in an embodiment 6.

Figure 12:
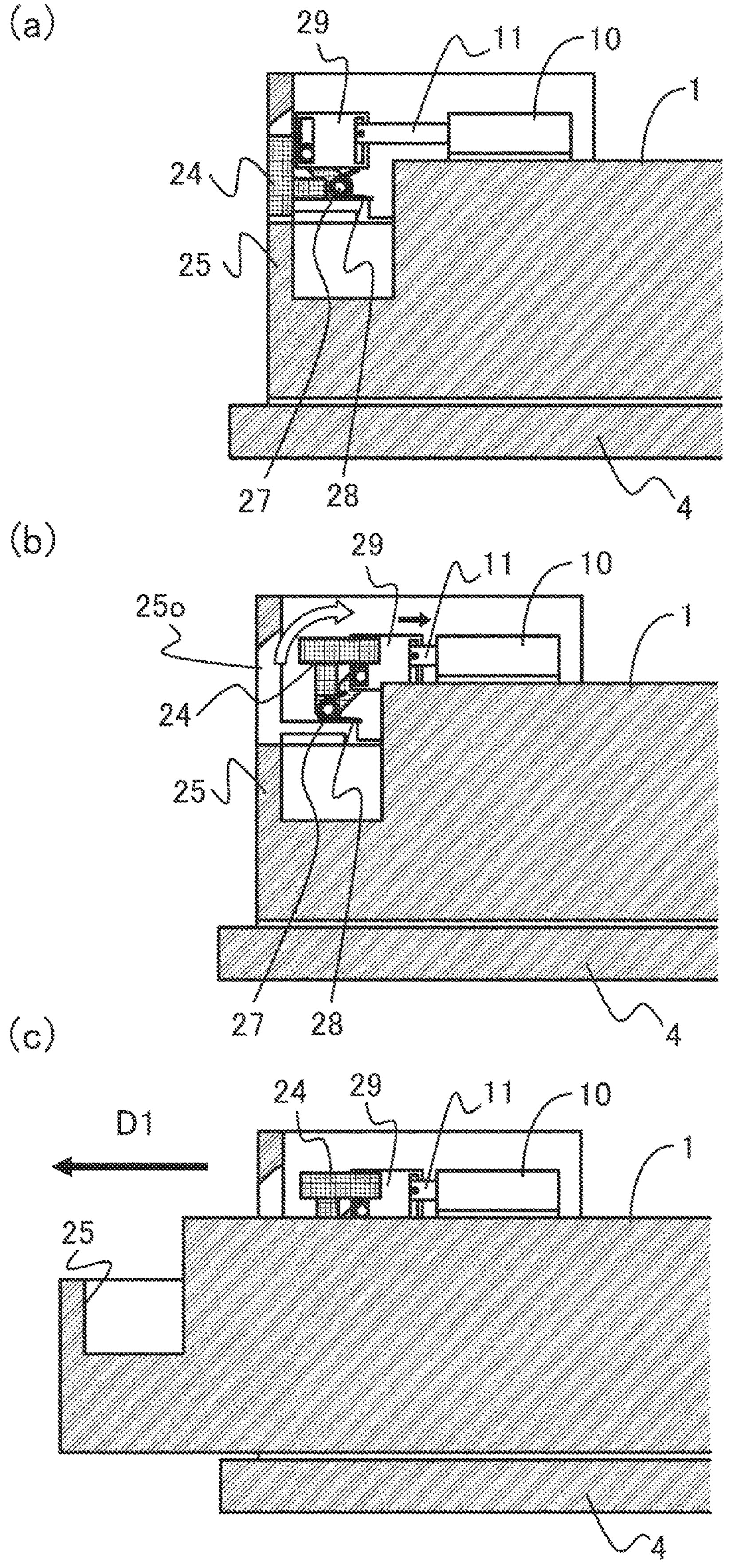

Parts (a), (b) and (c) of FIG. 12 are sectional views of a cover open/close mechanism in the embodiment 6.

Figure 13:
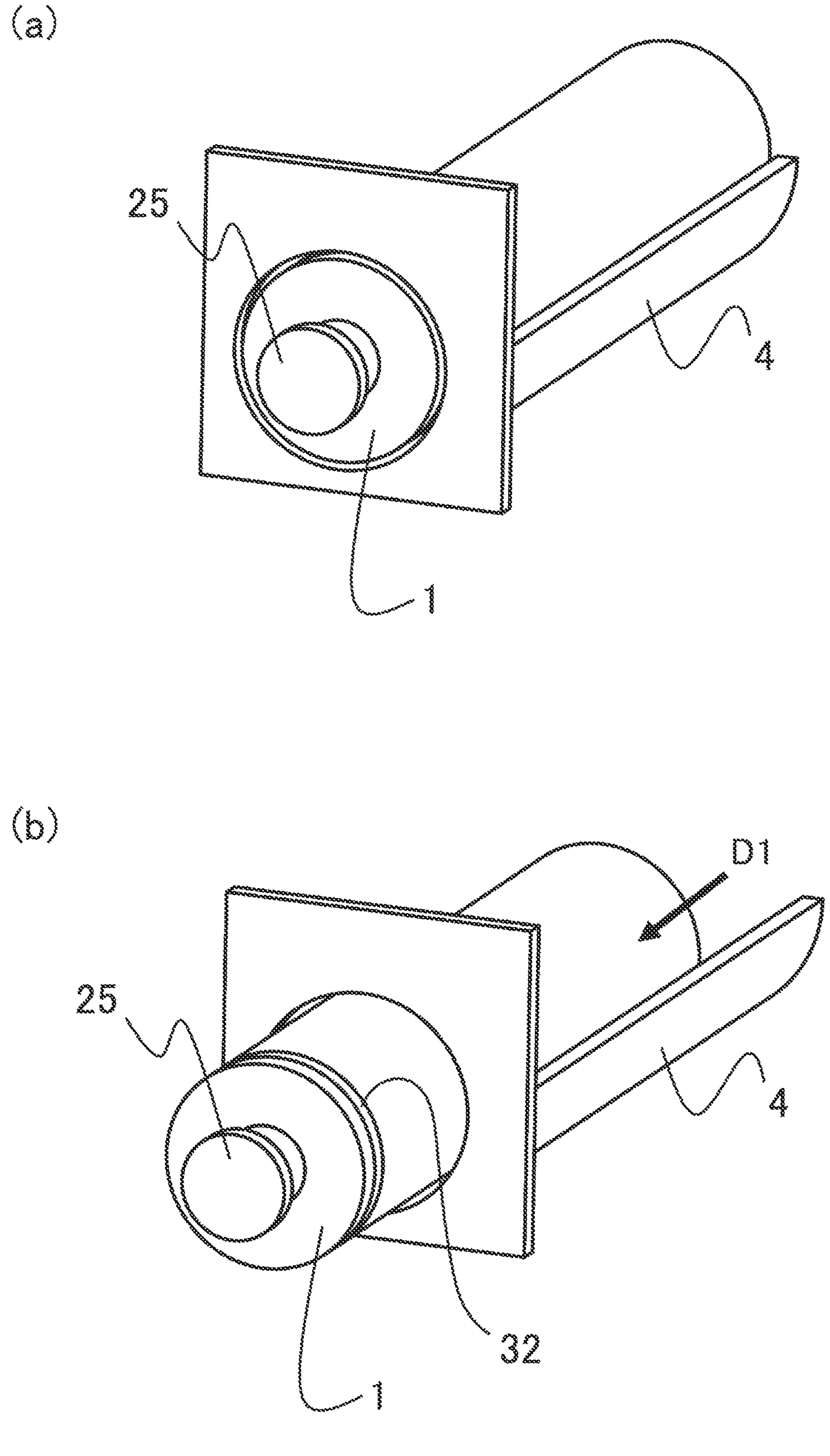

Parts (a) and (b) of FIG. 13 are perspective views of a cartridge mounting portion in an embodiment 7.

Figure 14:
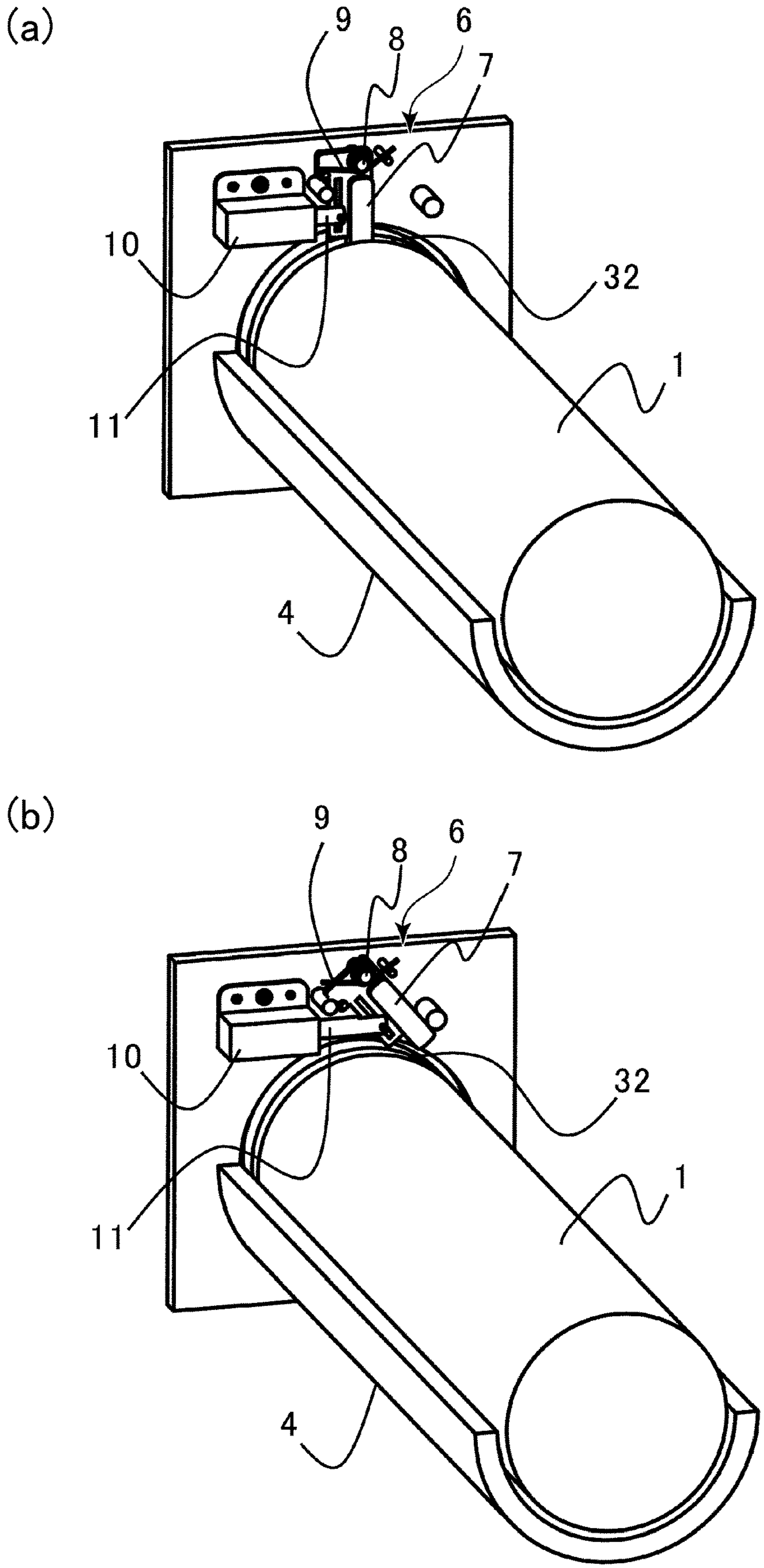

Parts (a) and (b) of FIG. 14 are perspective views of a locking mechanism in the embodiment 7.

Figure 15:
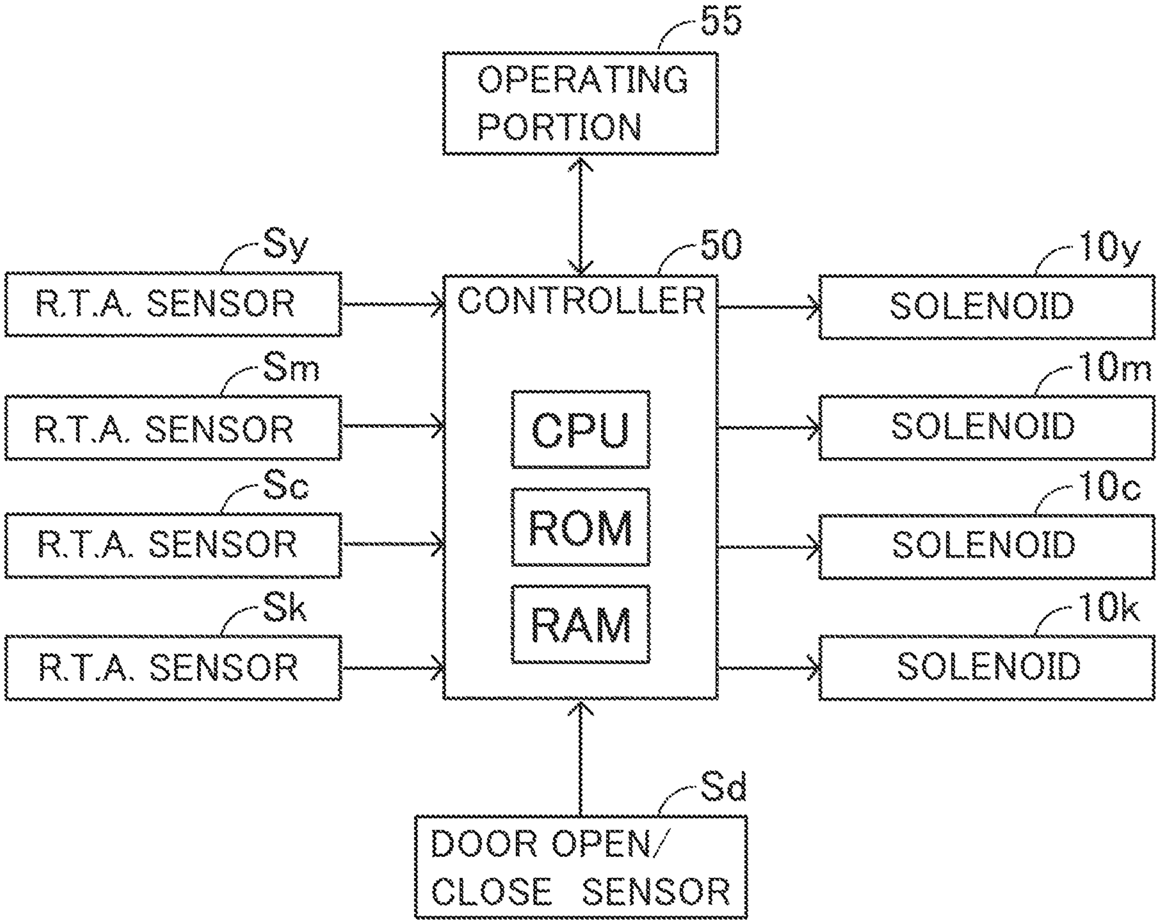

FIG. 15 is a block diagram showing a constitution of the image forming apparatus of the embodiment 1.

Figure 16:
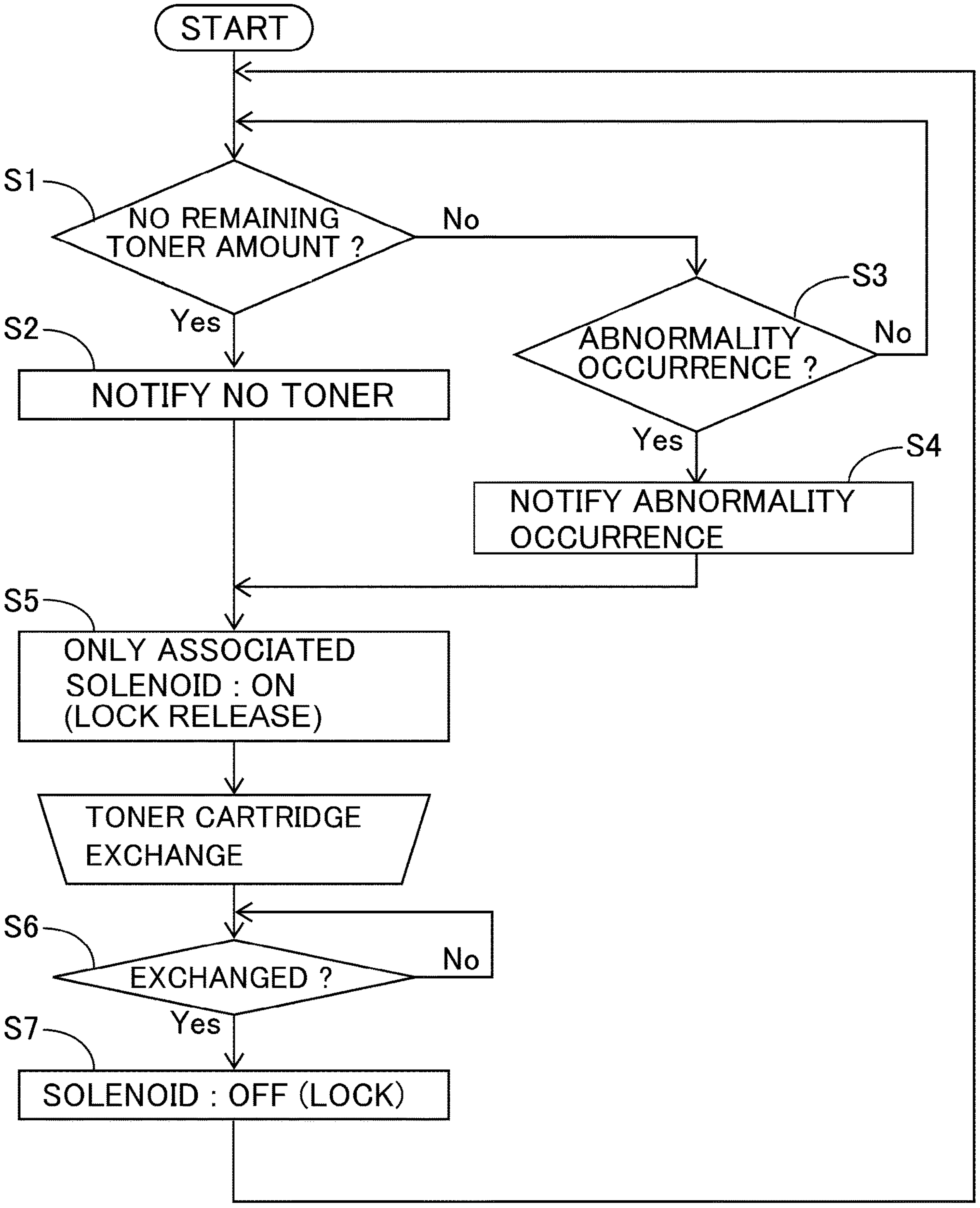

FIG. 16 is a flowchart showing a control method of the image forming apparatus of the embodiment 1.

DESCRIPTION OF THE EMBODIMENTS

In the following, embodiments of the present invention will be described while making reference to the drawings.

Embodiment 1

Figure 1:
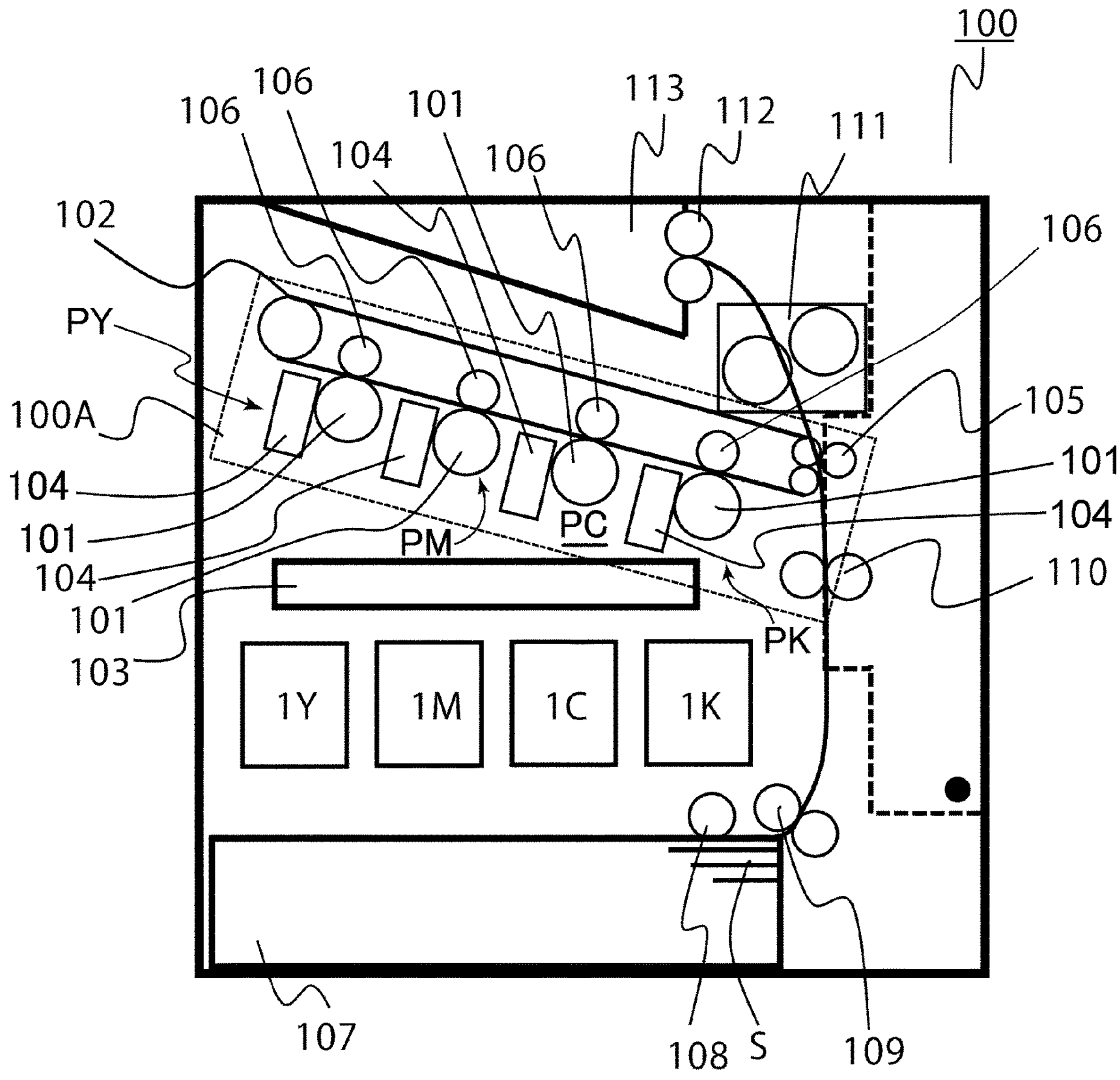
FIG. 1 is a schematic view of an image forming apparatus according to an embodiment 1.

An embodiment 1 of the present invention will be described. FIG. 1 is a schematic view showing a cross-sectional structure of an image forming apparatus 100 according to this embodiment as viewed from a front side. The image forming apparatus 100 is a printer for forming a color image on a sheet S by an electrophotographic process on the basis of image information inputted from an external computer. As the sheet S which is a recording material (recording medium), it is possible to use various sheet materials different in size and material, such as paper including plain paper, thick paper, or the like; a plastic film; a cloth; a surface-treated sheet material like coated paper; and special-shaped sheet materials including an envelope, index paper, and the like.

Outline of Image Forming Apparatus

An outline of the image forming apparatus 100 will be described using FIG. 1. The image forming apparatus 100 includes an apparatus main assembly 100B (see FIG. 2) provided with an image forming portion 100A of an electrophotographic type and includes toner cartridges 1Y, 1M, 1C and 1K as a plurality of cartridges each mounted dismountably (disengageably, detachably) from the apparatus main assembly 100B. In other words, the toner cartridges 1Y, 1M, 1C and 1K are constituted so as to be mountable in and dismountable (disengageable) from the apparatus main assembly 100B. Incidentally, the apparatus main assembly 100B in this embodiment refers to a portion excluding the toner cartridges 1Y, 1M, 1C and 1K from the image forming apparatus 100.

The image forming portion 100A includes four process cartridges PY, PM, PC and PK, a laser scanner 103, an intermediary transfer belt 102, primary transfer rollers 6, and a secondary transfer roller 105.

The four process cartridges PY, PM, PC and PK have substantially the same constitution except that colors of toners accommodated in developing devices 104 are different from each other. That is, each of the process cartridges PY to PK includes a photosensitive drum 101 as an image bearing member, the developing device 104 as a developing means, an unshown charging device, and an unshown cleaning device. The photosensitive drum 101 is an electrophotographic photosensitive member molded in a drum shape (cylindrical shape) and is rotated while bearing an electrostatic latent image and then a toner image. The developing device 104 includes a developer container (accommodating portion) for accommodating the toner as a developer and includes a developing roller for supplying the toner to the photosensitive drum 101 while carrying the toner. The process cartridges PY, PM, PC and PK are image forming units for forming toner images of colors of yellow, magenta, cyan and black, respectively, on the photosensitive drums 101.

The toner cartridges 1Y, 1M, 1C and 1K accommodates the toners of yellow, magenta, cyan and black, respectively, as the developers for being supplied to the developing devices 104. That is, the toner cartridges 1Y to 1K corresponding to the developing devices 104, respectively. Each of the toner cartridges 1Y to 1K in a mounted state in the apparatus main assembly 100B is connected (caused to communicate) with the corresponding developing device 104 via a supplying device (hopper) provided in the apparatus main assembly 100B.

Incidentally, the developer accommodated in the developing device 104 may be a two-component developer containing the toner and a carrier and may also be a one-component developer principally comprising the toner. Further, the developer accommodated in the developing device 104 may be consisting only of the toner and may also be a mixture of the toner with the carrier in a small amount.

The intermediary transfer belt 102 is an endless intermediary transfer member. The intermediary transfer belt 102 is stretched by a plurality of rollers so as to contact the photosensitive drums 101 of the process cartridges, and is rotationally driven in the counterclockwise direction in FIG. 1. The four primary transfer rollers 106 are disposed opposed to the photosensitive drums 101 of the process cartridges PY to PK through the intermediary transfer belt 102. The secondary transfer roller 105 is disposed in a position where the secondary transfer roller 105 opposes one (inner secondary transfer roller) of the rollers for stretching the intermediary transfer belt 102 through the intermediary transfer belt 102. As a nip between the intermediary transfer belt 102 and the secondary transfer roller 105, a transfer portion (secondary transfer portion) where the image (toner image) is transferred onto the sheet S is formed. Further, below the intermediary transfer belt 102, the process cartridges PY to PK are disposed, and below the process cartridges PY to PK, the laser scanner 103 is disposed.

Further, the image forming apparatus 100 includes a fixing device 111 as a fixing means. The fixing device 111 is a heat-fixing device including, for example, a fixing roller, a pressing roller press-contacted to the fixing roller, and a halogen lamp as a heating means for heating the toner image. Incidentally, the present invention is not limited to the above-described constitution but may include, for example, a constitution in which a ceramic is provided in an inner space of a cylindrical film having flexibility and in which the toner image is heat-fixed by the film heated by non-radiant heat of the ceramic heater.

Further, the image forming apparatus 100 includes a mechanism for supplying sheets S by feeding the sheets S one by one. Specifically, a cassette 107 as a stacking portion (accommodating portion) in which the sheets S are stacked and accommodated, a pick-up roller 108 for feeding the sheets S from the cassette 107, and a separating roller pair 109 for feeding the sheets S while separating the sheets S one by one are provided. Further, a registration roller pair 109 for feeding the sheet S, fed from the cassette 107, to a registration roller pair 110, and a discharging roller pair 112 for discharging the sheet S, passed through the secondary transfer portion and the fixing device 111, to an outside of the apparatus main assembly 100B are provided.

In the following, an outline of an image forming operation by the image forming apparatus 100 will be described. When an execution instruction (print job) is inputted to the image forming apparatus 100, a controller of the image forming apparatus 100 executes the image forming operation on the basis of image information provided during the input of the job. First, drive of the photosensitive drums 101 of the process cartridges PY to PK and the intermediary transfer belt 102 is started, and the surface of each photosensitive drum 101 is electric charged uniformly by the charging device. The laser scanner 103 irradiates the photosensitive drum 101 while modulating laser light on the basis of a signal (video signal) generated and transmitted on the basis of the image information. By this, an electrostatic latent image corresponding to an associated single color of the photosensitive drum 101 is formed. The electrostatic latent image is developed with the toner of the associated color accommodated in the developing device 104, so that a single color toner image is formed.

The single color toner image formed on each photosensitive drum 101 is primary-transferred onto the intermediary transfer belt 102 by the associated primary transfer roller 106. At this time, the primary transfer is made at a synchronized timing such that the single color toner images formed on the photosensitive drums 101 are transferred superposedly on the intermediary transfer belt 102, so that a full-color toner image is formed on the intermediary transfer belt 102. This toner image is conveyed to the secondary transfer portion while being carried on the intermediary transfer belt 102.

In parallel to preparation of the toner image in the image forming portion 100A, the sheets S are fed from the cassette 107 by the pick-up roller 108 and are triboelectrically separated and fed one by one by the separating roller pair 109. The registration roller pair 110 corrects oblique movement of the sheet S fed from the separating roller pair 109 and then feeds the sheet S to the secondary transfer portion. At this time, a drive timing and a driving speed of the registration roller pair 110 are controlled so that a timing when the toner images on the intermediary transfer belt 102 reach the secondary transfer portion and a timing when the sheet S enters the secondary transfer portion are synchronized with each other. By this, positional alignment of the image with the sheet with respect to a sheet feeding direction (sub-scan direction) is made. Then, when the sheet S passes through the secondary transfer portion, a voltage is applied to the secondary transfer roller 105, so that the toner image is transferred (secondary-transferred) from the intermediary transfer belt 102 onto the sheet S.

The sheet S passed through the secondary transfer portion is conveyed to the fixing device 111. The fixing device 111 fixes the toner image on the sheet S by heating and pressing the toner image on the sheet S while nipping and feeding the sheet S to a nip (fixing nip) between the fixing roller and the pressing roller. The sheet S passed through the fixing device 111 is discharged to the outside of the apparatus main assembly 100B by the discharging roller pair 112 and is stacked on a discharge tray 113 provided on an upper surface portion of the apparatus main assembly 100B.

The image forming operation as described above is repetitively executed, and when the toner in the developing device 104 is consumed, the toner is supplied (replenished) from the associated one of the toner cartridges 1Y to 1K to the developing device 104. By this, a state in which the toner in a substantially constant amount is accommodated in the developing device 104 is maintained.

Incidentally, the above-described constitution of the image forming apparatus 100 is an example, and for example, a constitution in which a color image is formed by successively transferring single color toner images, formed on a plurality of photosensitive drums, onto a sheet S while attracting the sheet S to a belt and feeding the sheet S may be employed.

Outline of Cartridge Exchange

Figure 2:
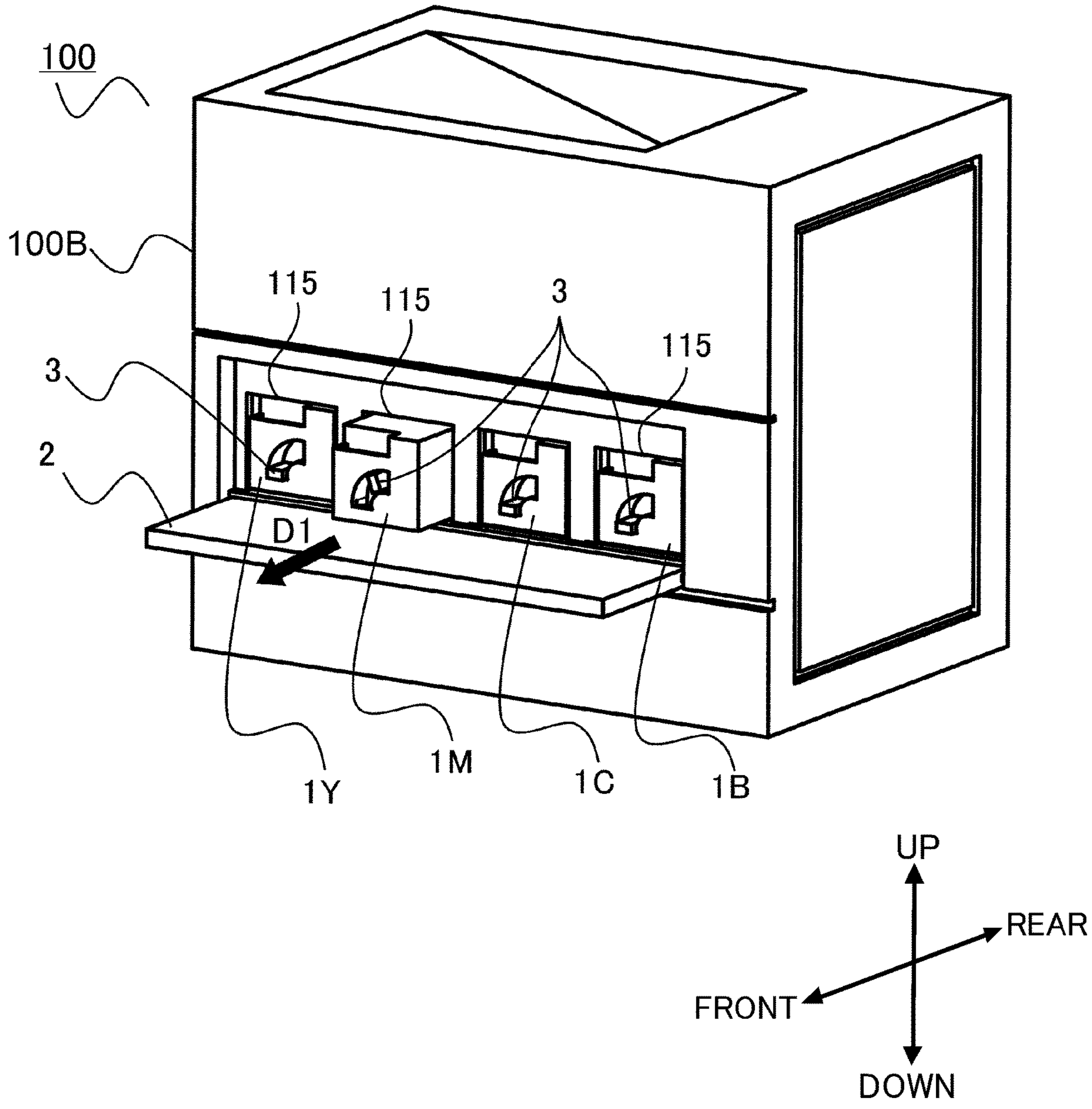
FIG. 2 is a perspective view of the image forming apparatus of the embodiment 1.

An exchanging method of the toner cartridges 1Y to 1K will be described using FIG. 2. As shown in FIG. 2, on a side surface of the apparatus main assembly 100B on a left front side in the figure, a front door 2 as an openable member which is openable relative to the apparatus main assembly 100B is device. Each of the toner cartridges 1Y to 1M is constituted detachably mountable to the apparatus main assembly 100B through an opening 115 device in the apparatus main assembly 100B.

In a state in which the front door 2 is closed, the opening 115 and the toner cartridges 1Y to 1K are covered by the front door 2, and therefore, the user or the service person (hereinafter, inclusively referred to as an operator) cannot visually recognize the toner cartridges 1Y to 1K. In a state in which the front door 2 is open, the opening 115 and the toner cartridges 1Y to 1K are exposed. As described later, in the state in which the front door 2 is open and in the case where lock of either of the toner cartridges 1Y to 1K is released, the operator is capable of gripping and dismounting the lock-released one of the toner cartridges 1Y to 1K. FIG. 2 shows a state during an operation in which the toner cartridge 1M for magenta of the four toner cartridges 1Y to 1K is exchanged.

In the following, a movement direction of the toner cartridges 1Y to 1K when the toner cartridges 1Y to 1K are dismounted (disengaged) from the apparatus main assembly 100B is referred to as a dismounting direction (disengaging direction) D1. A side where the image forming apparatus 100 is provided with the front door 2 is referred to as a front (surface) side of the image forming apparatus 100, and an opposite side (left rear side in FIG. 2) thereto is referred to as a rear (surface) side of the image forming apparatus 100. Further, an up-down direction refers to a vertical direction in a state in which the image forming apparatus 100 is installed on the horizontal surface.

Cartridge Mounting Portion

Cartridge mounting portions which are provided in the apparatus main assembly 100B and on which the toner cartridges 1Y to 1K are detachably mountable will be described. In this embodiment, the toner cartridges 1Y to 1K and the cartridge mounting portions have substantially common constitutions. Accordingly, in the following description, an arbitrary one of the toner cartridges 1Y to 1K is referred to as a "toner cartridge 1", and the cartridge mounting portion corresponding thereto will be described. The cartridge mounting portion refers to a portion constituting an accommodating space for accommodating the toner cartridge 1 in the apparatus main assembly 100B.

Parts (a) to (c) of FIG. 3 are perspective views of the contact mounting portion. Part (a) of FIG. 3 shows a state in which the toner cartridge 1 is mounted in a predetermined mounting position in the apparatus main assembly 100B and is locked by a locking mechanism 6 described later. Part (b) of FIG. 3 shows a state in which the toner cartridge 1 is positioned in the predetermined mounting position and lock of the locking mechanism 6 is released. Part (c) of FIG. 3 shows a state in which a guide cover 5 is dismounted from a cartridge guide 4 in a state in which the toner cartridge is dismounted.

As shown in parts (a) and (b) of FIG. 3, the cartridge mounting portion includes the cartridge guide 4 as a supporting member for supporting the toner cartridge 1 mounted in the apparatus main assembly 100B. The cartridge guide 4 is a member which includes a supporting surface 4*b* for supporting a lower surface of the toner cartridge 1 and which extends in the dismounting direction a thin and long cross-sectional shape such that the cartridge guide 4 has a U-character shape (angulated C-character shape) which open upward as viewed from a downstream of a dismounting direction D1. Accordingly, the cartridge guide 4 functions as a guiding means for guiding the toner cartridge 1 when the toner cartridge 1 is moved in the dismounting direction D1 and a mounting direction D2 opposite to the dismounting direction D1. Incidentally, the toner cartridge 1 has substantially rectangular shape which is thin and long in the dismounting direction D1 (front-rear direction of the image forming apparatus).

In this embodiment on a solenoid surface of the toner cartridge 1 with respect to the dismounting direction D1, i.e., on a side surface of the apparatus on the front side, a cartridge fixing lever 3 is position. The cartridge fixing lever 3 is a member operated by the operator for switching the locking member described later between a locked state in which the dismounting of the toner cartridge 1 is restricted and a lock-released state in which the dismounting of the toner cartridge 1 is permitted. That is, the cartridge fixing lever 3 is an example of an operating portion manually operated when the toner cartridge 1 is dismounted from the apparatus main assembly 100B. As described later, the controller 50 of the image forming apparatus 100 discriminates that there is no need to exchange the toner cartridge 1, the operation of the cartridge fixing lever 3 is restricted and the cartridge fixing lever 3 becomes inoperable.

When the cartridge fixing lever 3 is in a fixing position shown in part (a) of FIG. 3, the locking member 6 becomes the locked state, so that the movement of the toner cartridge 1 in the dismount direction D1 is restricted. When the cartridge fixing lever 3 is in a lock-released position shown in part (b) of FIG. 3, the locking member 6 becomes the lock-released state, so that the movement of the toner cartridge 1 in the dismounting direction D1 is permitted. In this state, the operator pulls out the toner cartridge 1 in the dismounting direction D1 along the cartridge guide 4 by gripping a grip portion 1*h* of the toner cartridge 1, so that the operator is capable of pulling out the toner cartridge 1 from the apparatus main assembly 100B. Further, the operator inserts the toner cartridge 1 in the mounting direction D2 along the cartridge guide 4 into the cartridge mounting portion where the toner cartridge 1 is not mounted, so that the toner cartridge 1 can be mounted in the apparatus main assembly 100B.

Part (c) of FIG. 3 is a schematic view showing the locking mechanism as a dismounting restricting means (cartridge disengagement restricting mechanism) for restricting the dismounting of the toner cartridge 1. At least a part of the locking mechanism 6 is accommodated in a locking mechanism accommodating portion 4*s* recessed downward from the supporting surface 4*b* in the cartridge guide 4 and is covered with a guide cover 5 from above. The guide cover 5 is mounted on the cartridge guide 4 so as to substantially flush with the supporting surface 4*b* of the cartridge guide 4, and guides the lower surface of the toner cartridge 1 in cooperation with the supporting surface 4*b*.

Locking Mechanism

The locking mechanism 6 in this embodiment will be described using parts (a) and (b) of FIG. 4. The locking mechanism 6 is disposed in the mounting portion of each of the toner cartridge 1Y to 1K. That is, the image forming apparatus 100 of this embodiment is provided with four locking mechanisms 6 as examples of a plurality of dismounting restricting means provided correspondingly to the plurality of cartridges. In the following, the locking mechanism 6 corresponding to an arbitrary one of the toner cartridges 1Y to 1K will be described, but the locking mechanisms 6 corresponding to other toner cartridges have substantially the same constitution.

Parts (a) and (b) of FIG. 4 are perspective views of the locking mechanism 6 as viewed in an arrow W direction of part (c) of FIG. 3. Part (a) of FIG. 4 shows the locked state of the locking mechanism 6, and part (b) of FIG. 4 shows not only the lock-released state of the locking mechanism 6 but also a state in which the cartridge fixing lever 3 is moved to the fixing releasing position.

As shown in parts (a) and (b) of FIG. 4, the locking mechanism 6 in this embodiment includes the cartridge fixing lever 3, a portion-to-be-locked (portion-to-be-engaged) 3*a*, a locking portion (engaging portion) 4*a*, a locking arm 7, an arm urging spring 9, and a solenoid 10. The cartridge fixing lever 3 and the portion-to-be-locked 3*a* are provided on the toner cartridge 1. The locking arm 7, the arm urging spring 9, and the solenoid 10 are mounted in the cartridge guide 4. That is, the locking arm 7, the arm urging spring 9, and the solenoid 10 are provided in the apparatus main assembly 100B.

The cartridge fixing lever 3 is provided rotatably about an axis extending substantially parallel to the dismounting direction D1. The cartridge fixing lever 3 includes a gripping portion 3*b* gripped by the operator. In the case where the gripping portion 3*b* is viewed from the downstream of the dismounting direction D1 in a state in which the front door 2 is open, the gripping portion 3*b* is exposed to an outside of a frame of the toner cartridge 1 through a guide groove 1*g* provided on the frame of the toner cartridge 1 (parts (a) and (b) of FIG. 3).

The portion-to-be-locked 3*a* is a portion-to-be-locked by the locking portion 4*a* on the apparatus main assembly 100B, and is constituted so as to move relative to the locking portion 4*a* with an operation of the cartridge fixing lever 3. In this embodiment, as a member provided integrally with the cartridge fixing lever 3, the portion-to-be-locked 3*a* is provided, but the portion-to-be-locked 3*a* may be interrelated with the cartridge fixing lever 3 through a link.

Incidentally, in a state in which the cartridge fixing lever 3 is positioned in the fixing position (part (a) of FIG. 3, part (a) of FIG. 4), the portion-to-be-locked 3*a* which is a part of the toner cartridge 1 projects downward from the supporting surface 4*b* of the cartridge guide 4 and an upper surface of the guide cover 5. For this reason, the guide cover 5 is provided with a cut-away portion 5*a* (part (c) of FIG. 3) vertically passing through the guide cover 5 so as to receive the portion-to-be-locked 3*a*.

The locking portion 4*a* is a part of the cartridge guide 4 and is particularly a wall portion on a side downstream of the locking mechanism accommodating portion 4*s* with respect to the dismounting direction D1. The locking portion 4*a* is positioned on the side downstream of the portion-to-be-locked 3*a* with respect to the dismounting direction.

As shown in part (a) of FIG. 4, when the cartridge fixing lever 3 is positioned in the fixing position, the portion-to-be-locked 3*a* is positioned in a position (locking position) overlapping with the locking portion 4*a* as viewed in the dismounting direction D1. For this reason, when the cartridge fixing lever 3 is positioned in the fixing position, the portion-to-be-locked 3*a* is locked by (interfaces with) the locking portion 4*a*, so that movement of the toner cartridge 1 in the dismounting direction is restricted. On the other hand, as shown in part (b) of FIG. 4, when the cartridge fixing lever 3 is positioned in the fixing releasing position, the portion-to-be-locked 3*a* is positioned in a position (lock releasing position) non-overlapping with the locking portion 4*a*. For this reason, when the cartridge fixing lever 3 is positioned in the fixing releasing position, the movement of the toner cartridge 1 in the dismounting direction D1 is permitted without locking the portion-to-be-locked 3*a* by the locking portion 3*a* (interference).

The locking arm 7 is provided rotatably about a rotation shaft 8 fixed to the cartridge guide 4. The locking arm 7 is movable between a locking position (part (a) of FIG. 4) where movement of the cartridge fixing lever 3 from the fixing position to the fixing releasing position is restricted and a lock releasing position (part (b) of FIG. 4) where the movement of the cartridge fixing lever 3 from the fixing position to the fixing releasing position is permitted. That is, in the case where the locking arm 7 is positioned in the locking position, rotation of the cartridge fixing lever 3 in a predetermined rotational direction (counterclockwise direction in the figure) is restricted by the locking arm 7. The locking arm 7 functions as a restricting member movable to a first position (locking position) where release of lock (locking) between the portion-to-be-locked 3*a* and the locking portion 4*a* is restricted and a second position (lock releasing position) where the release of the lock between the portion-to-be-locked 3*a* and the locking portion 4*a* is permitted.

The arm urging spring 9 is an urging member for urging the locking arm 7 toward the locking position. The arm urging spring 9 is a torsion coil spring mounted around the rotation shaft 8.

The solenoid 10 attracts a plunger 11 by a magnetic field generated by energization. The plunger 11 is rotatably connected to the locking arm 7. When the plunger 11 is attracted to the solenoid 10, the locking arm 7 moves from the locking position to the lock releasing position against an urging force of the arm urging spring 9. When the plunger 11 is released from the solenoid 10, the locking arm 7 moves from the lock releasing position to the locking position in accordance with the urging force of the arm urging spring 9.

That is, the solenoid 10 functions as an actuator for moving the locking arm 7 between the locking position and the lock releasing position.

As shown in part (a) of FIG. 4, in the case where the energization to the solenoid 10 is not made, the locking arm 7 is held in the locking position. In this state, even when the operator intends to move the cartridge fixing lever 3 from the fixing position to the fixing releasing position, the portion-to-be-locked 3*a* interferes with the locking arm 7, and therefore, the operator cannot operate the cartridge fixing lever 3. That is, the locking mechanism 6 is in a locked state in which the operation of the cartridge fixing lever 3 which is an operating portion is restricted.

On the other hand, as shown in part (b) of FIG. 4, when the plunger 11 is attracted by energization to the solenoid 10, the locking arm 7 is moved from the locking position to the lock releasing position. In this state, the locking arm 7 is retracted from a movement locus of the portion-to-be-locked 3*a*, and therefore, the operator is capable of moving the cartridge fixing lever 3 from the fixing position (position of part (a) of FIG. 4) to the fixing releasing position (position of part (b) of FIG. 4) by operating the cartridge fixing lever 3. That is, the locking mechanism 6 is in the lock-released state in which the operation of the cartridge fixing lever 3 which is the operating portion is permitted.

Incidentally, in this embodiment, the locking arm 7 is provided with the cut-away portion 7*a*. The cut-away portion 7*a* is formed so that the movement locus of the portion-to-be-locked 3*a* when the cartridge fixing lever 3 is operated in the state in which the locking arm 7 is positioned in the lock released position (part (b) of FIG. 4) is avoided. By providing such a cut-away portion 7*a*, a rotation range of the locking arm 7 can be suppressed while ensuring an operating property of the cartridge fixing lever 3, so that the locking mechanism 6 can be disposed in a compact space.

Thus, a new constitution capable of restricting dismounting of the cartridge can be provided by the locking mechanism 6 including the portion-to-be-locked 3*a*, the locking portion 4*a*, the cartridge fixing lever 3 (operating portion), the locking arm 7 (restricting member) and the solenoid 10 (actuator).

Lock Control for Each Toner Cartridge

Next, a method of controlling the plurality of locking mechanisms 6 provided correspondingly to the plurality of toner cartridges will be described using FIGS. 15 and 16. FIG. 15 is a black diagram showing a control circuit of the image forming apparatus 100 relating to control of the locking mechanism 6. FIG. 16 is a flowchart showing an example of a control method of the image forming apparatus 100.

As shown in FIG. 15, the image forming apparatus 100 includes the controller 50 as a control means. The controller 50 includes a CPU for executing a control program of the image forming apparatus 100, a non-volatile storing device (ROM) for storing the control program, and a storing device (RAM) providing a working place when the CPU executes the control program. The ROM storing the control program is an example of a non-transit storing medium capable of being read by a computer.

The controller 50 is electrically connected to remaining toner amount sensors Sy, Sm, Sc and Sk provided on the toner cartridges 1Y to 1K and solenoids 10*y*, 10*m*, 10*c* and 10*k* of the locking mechanisms 6 corresponding to the toner cartridges 1Y to 1K. The remaining toner amount sensors Sy to Sk are sensors for issuing detection signals depending on remaining toner amounts in the toner cartridges 1Y to 1K. As a specific structure of the sensors, it is possible to use known structure. The controller 50 provides an instruction to driving circuits for driving the solenoids 10*y* to 10*k*, so that energization to the solenoids 10*y* to 10*k* is controlled. By individually controlling the solenoids 10*y* to 10*k* in accordance with the flowchart described later, the plurality of locking mechanisms 6 can be selectively (i.e., independently) switched between the locked state and the lock-released state to each other.

Further, the controller 50 is electrically connected to an operating portion 55 as a user interface of the image forming apparatus 100 and a door open/close sensor Sd for detecting open/close of the front door 2 (FIG. 2). The operating portion 55 includes a liquid crystal panel as a display device for presenting information to the operator by a character or an image and includes numerical keys and a touch panel function portion which are used as an input device for receiving an operation instruction from the operator and input of setting information. The door open/close sensor Sd is, for example, a switch constituted so as to be turned on and off (ON/OFF) depending on open/close of the front door 2.

FIG. 16 shows contents of control continuously carried out by the controller 50 in a state in which a power source for the image forming apparatus 100 is turned on. The controller 50 monitors whether or not there is no toner cartridge 1Y to 1K in which the residual toner amount is less than a predetermined amount (S1). In the case where the controller 50 detected that the residual toner amount of either one of the toner cartridges became less than the predetermined amount, the controller 50 notifies the operator of that the toner in the associated toner cartridge is used up and prompts the operator to exchange the toner cartridge (S2). Here, notification to the operator may be performed by display at the operating portion 55 and by issuing the notification to the external computer connected to the controller 50 via a network.

Then, the controller 50 monitors whether or not some abnormality occurs in the toner cartridges 1Y to 1K (S3). The abnormality of the toner cartridges 1Y to 1K is, for example, the case where information read from a memory chip (IC tag) mounted on the toner cartridges 1Y to 1K is not adapted to a predetermined standard (for example, the toner cartridge for an incorrect color of the toner is mounted). Further, as another example of the abnormality of the toner cartridges 1Y to 1K, a load of a motor for driving a screw for feeding the toner in the associated one of the toner cartridges 1Y to 1K becomes abnormally large. The above-described cases are merely examples, the controller 50 discriminates that the abnormality occurred in the case where there is an obstacle to continuous use of the toner cartridges 1Y to 1K. In the case where the abnormality occurred in either one of the toner cartridges 1Y to 1K, the controller 50 notifies the operator of the occurrence of the abnormality of the associated toner cartridge and prompts the operator to exchange the toner cartridge (S4).

In the case where the notification of S3 or S4 is made, the controller 50 energizes the solenoid 10 of the locking mechanism 6 corresponding to the toner cartridge to be exchanged, so that the lock of the locking mechanism 6 is released (S5). By this, the operator is capable of performing an exchanging operation by dismounting the toner cartridge, to be exchanged, from the apparatus main assembly 100B. On the other hand, the controller 50 does not energize the solenoids 10 of the locking mechanisms 6 corresponding to the toner cartridges other than the toner cartridge to be exchanged, so that the locked state of the locking mechanisms 6 is maintained. By this, exchange of the toner cartridges other than the toner cartridge to be exchanged can be prevented.

When an end of the exchange of the toner cartridge is detected (S6), the controller 50 cuts off the energization to the locking mechanism 6 corresponding to the toner cartridge to be exchanged and puts the locking mechanism 6 in the locked state again (S7). Incidentally, the end of the exchange of the toner cartridge is discriminated on the basis of that the front door 2 is opened and then is closed, by the detection signal of the door open/close sensor Sd, for example.

Incidentally, in this embodiment, the case where the controller 50 discriminates necessity of the exchange of the toner cartridge on the basis of the residual toner amount and the occurrence of the abnormality was described, but the necessity of the exchange of the toner cartridge may be discriminated on another basis. Further, the controller may start the energization to the solenoid 10 of the locking mechanism 6 corresponding to the toner cartridge to be exchanged after the notification of S3 or S4 is made and then the open of the front door 2 is detected by the door open/close sensor.

As described above, according to this embodiment, the plurality of the locking mechanisms 6 are provided correspondingly to the plurality of toner cartridges 1Y to 1K. Further, the controller t0 selectively controls the solenoid 10 (actuator) provided on each of the plurality of locking mechanisms 6. By this, while only the toner cartridge which is discriminated by the controller 50 that the exchange thereof is needed is enabled to be exchanged by releasing the lock of the locking mechanism 6, it is possible to prevent exchange of other toner cartridges.

That is, the image forming apparatus of this embodiment includes a first cartridge detachably mounted in the apparatus main assembly and a second cartridge detachably mounted separately from the first cartridge. Further, the image forming apparatus of this embodiment includes a first dismounting restricting means provided with a first actuator for switching a state in which dismounting of the first cartridge is restricted and a state in which the dismounting of the first cartridge is detected. Further, the image forming apparatus of this embodiment includes a second dismounting restricting means provided with a second actuator for switching a state in which dismounting of the second cartridge is restricted and a state in which the dismounting of the second cartridge is permitted.

Further, the image forming apparatus of this embodiment includes a control means for controlling the first actuator and the second actuator independently of each other.

The first cartridge is, for example, the toner cartridge 1Y, and the first dismounting restricting means and the first actuator are the locking mechanism 6 and the solenoid 10, respectively, corresponding to this toner cartridge 1Y. Further, the second cartridge is, for example, the toner cartridge 1M other than the toner cartridge 1Y, and the second dismounting restricting means and the second actuator are the locking mechanism 6 and the solenoid 10, respectively, corresponding to this toner cartridge 1M.

That is, according to this embodiment, by a simple constitution, dismounting of the plurality of cartridges can be individually restricted.

Further, in this embodiment, in the locked state of the locking mechanism 6, the cartridge fixing lever 3 which is the operating portion is in an inoperable state, and therefore, the operator is capable of easily grasping that the associated toner cartridge cannot be dismounted.

Further, a constitution in which by the operation of the cartridge fixing lever 3, the toner cartridge is fixed to the predetermined position of the apparatus main assembly 100B and the fixing of the toner cartridge is released is employed in general. For that reason, the constitution of this embodiment in which a function of restricting dismounting of each toner cartridge by locking the cartridge fixing lever 3 with the locking arm 7 is added is not largely changed from an operating method with which the operator has familiarity, and therefore usability is easily ensured.

Embodiment 2

Next, an embodiment 2 will be described. This embodiment is different from the embodiment 1 in details of the constitution relating to mounting and dismounting of the toner cartridge. In the following, elements to which reference numerals or symbols common to the embodiments 1 and 2 are added have substantially the same constitutions and functions as those described in the embodiment 1 unless otherwise specified, and a portion different from the embodiment 1 will be principally described.

Parts (a) to (c) of FIG. 5 are perspective views of the contact mounting portion in this embodiment. Part (a) of FIG. 5 shows a state in which the toner cartridge 1 is mounted in a predetermined mounting position in the apparatus main assembly 100B and is locked by a locking mechanism 6 described later. Part (b) of FIG. 5 shows a state in which the toner cartridge 1 is positioned in the predetermined mounting position and lock of the locking mechanism 6 is released. Part (c) of FIG. 5 shows a state in which a guide cover 5 is dismounted from a cartridge guide 4 in a state in which the toner cartridge 1 is dismounted.

In this embodiment on a solenoid surface of the toner cartridge 1 with respect to the dismounting direction D1, i.e., on a side surface of the apparatus on the front side, a fixing releasing lever 12 is position. The fixing releasing lever 12 is a member operated by the operator for switching the locking member between a locked state in which the dismounting of the toner cartridge 1 is restricted and a lock-released state in which the dismounting of the toner cartridge 1 is permitted. That is, the fixing releasing lever 12 is an example of an operating portion manually operated when the toner cartridge 1 is dismounted from the apparatus main assembly 100B. The controller 50 of the image forming apparatus 100 discriminates that there is no need to exchange the toner cartridge 1, the operation of the fixing releasing lever 12 is restricted and the cartridge fixing lever 3 becomes inoperable.

Further, in the apparatus main assembly 100B, a pushing-out spring 17 as a pushing-out means for pushing out the toner cartridge 1 to an outside of the apparatus main assembly 100B. The cartridge pushing-out spring 17 urges the toner cartridge 1, mounted in the apparatus main assembly 100B, in the dismounting direction D1.

When the fixing releasing lever 12 is in a fixing position shown in part (a) of FIG. 5, the locking member 6 becomes the locked state, so that the movement of the toner cartridge 1 in the dismount direction D1 is restricted. In this case, the toner cartridge 1 remains in the mounting position against the urging force of the cartridge pushing-out spring 17.

On the other hand, when the fixing releasing lever 12 in moved to a fixing-locked position shown in part (b) of FIG. 5, the locking member 6 becomes the lock-released state, so that the movement of the toner cartridge 1 in the dismounting direction D1 is permitted. In this case, in accordance with the urging force of the cartridge pushing-out spring 17, the toner cartridge 1 is moved from the mounting position in the dismounting direction D1 and is pushed out toward the outside of the apparatus main assembly 100B.

Part (c) of FIG. 5 is a schematic view showing the locking mechanism as a dismounting restricting means for restricting the dismounting of the toner cartridge 1. At least a part of the locking mechanism 6 is accommodated in a locking mechanism accommodating portion 4*s* recessed downward from the supporting surface 4*b* in the cartridge guide 4 and is covered with a guide cover 5 from above. The guide cover 5 in this embodiment is positioned at an end portion of the supporting surface 4*b* of the cartridge guide 4 on one side of the supporting surface 4*b* as viewed from a downstream of the dismounting direction D1.

The locking mechanism 6 as a dismounting restricting means in this embodiment will be described using parts (a) to (c) of FIG. 6. The locking mechanism 6 is provided correspondingly to each of the toner cartridge 1Y to 1K, similarly as in the embodiment 1. In the following, the locking mechanism 6 corresponding to an arbitrary one of the toner cartridges 1Y to 1K will be described, but the locking mechanisms 6 corresponding to other toner cartridges have substantially the same constitution.

Parts (a) to (c) of FIG. 6 are sectional views of details of the locking mechanism 6 as viewed in a direction toward a V-V cross section shown in part (c) of FIG. 5. Part (a) of FIG. 6 shows the locked state of the locking mechanism 6. Part (b) of FIG. 6 shows not only the lock-released state of the locking mechanism 6 but also a state in which the cartridge fixing lever 3 is positioned in the fixing position. Part (c) of FIG. 6 shows not only the lock-released state of the locking mechanism 6 but also a state in which the cartridge fixing lever 3 is positioned in the fixing releasing position.

As shown in part (a) of FIG. 6, the locking mechanism 6 in this embodiment includes fixing releasing lever 12, a lever urging spring 13, a latch engaging portion 1A, a latch 14, a latch urging spring 15, a lock slider 37, a slider urging spring 39, and a solenoid 10. The fixing releasing lever 12, the lever urging spring 13, and the latch engaging portion 1A are provided on the toner cartridge 1. The latch 14, the latch urging spring 15, the lock slider 37, the slider urging spring 39, and the solenoid 10 are mounted in the cartridge guide 4. That is, the latch urging spring 15, the lock slider 37, the slider urging spring 39, and the solenoid 10 are provided in the apparatus main assembly 100B.

The fixing releasing lever 12 is provided slidably relative to a frame of the toner cartridge 1 in a direction crossing the dismounting direction D1, particularly the up-down direction in this embodiment. The fixing releasing lever 12 includes a gripping portion 12*b* gripped by the operator. In the case where the gripping portion 12*b* is viewed from the downstream of the dismounting direction D1 in a state in which the front door 2 is open, the gripping portion 12*b* is exposed to an outside of the frame of the toner cartridge 1 through a window portion 1*w* provided on the frame of the toner cartridge 1.

The lever urging spring 13 is connected to the fixing releasing lever 12 and the frame of the toner cartridge 1. The lever urging spring 13 urges the fixing releasing lever 12 toward the fixing position, i.e., upward.

The latch engaging portion 1A is a portion (portion-to-be-locked) locked by the latch 14 as a locking portion. The latch engaging portion 1A is a part of the frame of the toner cartridge 1 and is a surface facing a downstream of the dismounting direction D1.

The latch 14 is provided rotatably about a rotation shaft 16 fixed to the cartridge guide 4. The latch 14 includes an engaging surface 14*a* facing upward with respect to the dismounting direction D1 and is engageable with the latch engaging portion 1A of the toner cartridge 1 at the engaging surface 14*a*. The latch 14 is movable to a position (locking position, parts (a) and (b) of FIG. 6) where the engaging surface 14*a* overlaps with the latch engaging portion 1A as viewed in the dismounting direction and a position (lock-releasing position, part (c) of FIG. 6) where the engaging surface 14*a* does not overlap with the latch engaging portion 1A. Incidentally, as shown in part (c) of FIG. 5, the guide cover 5 is provided with a cut-away portion 5*a*. A space is ensured by the cut-away portion 5*a*, so that engagement between the engaging surface 14*a* of the latch 14 positioned under the guide cover 5 and the latch engaging portion 1A of the toner cartridge 1 on the guide cover 5 is enabled.

The latch urging spring 15 urges the latch 14 so as to maintain a state in which the latch 14 engages with the latch engaging portion 1A at the engaging surface 14*a*. That is, the latch urging spring 15 urges the latch 14 upward.

The lock slider 37 is slidably relative to the cartridge guide 4 along the dismounting direction D1.

The lock slider 37 is movable between a locking position (part (a) of FIG. 6) where movement of the fixing releasing lever 12 from the fixing position to the fixing releasing position is restricted and a lock releasing position (parts (b) and (c) of FIG. 6) where the movement of the fixing releasing lever 12 from the fixing position to the fixing releasing position is permitted. The lock slider 37 functions as a restricting member movable to a first position (locking position) where release of lock (locking) between the portion-to-be-locked (latch engaging portion 1A) and the locking portion (latch 14) is restricted and a second position (lock releasing position) where the release of the lock between the portion-to-be-locked and the locking portion is permitted.

The slider urging spring 39 is an urging member for urging the lock slider 37 toward the locking position. The slider urging spring 39 is a coil spring connected to the lock slider 37 and the cartridge guide 4.

The solenoid 10 attracts a plunger 11 by a magnetic field generated by energization. The plunger 11 is connected to the lock slider 37. When the plunger 11 is attracted to the solenoid 10, the lock slider 37 moves from the locking position to the lock releasing position against an urging force of the slider urging spring 39. When the plunger 11 is released from the solenoid 10, the lock slider 37 moves from the lock releasing position to the locking position in accordance with the urging force of the slider urging spring 39. That is, the solenoid 10 functions as an actuator for moving the lock slider 37 between the locking position and the lock releasing position.

As shown in part (a) of FIG. 6, in the case where the energization to the solenoid 10 is not made, the lock slider 37 is held in the locking position. In this state, even when the operator intends to move the fixing releasing lever 12 from the fixing position to the fixing releasing position, the fixing releasing lever 12 interferes with the latch 14 contacted to the lock slider 37, and therefore, the operator cannot operate the fixing releasing lever 12. In other words, the lock slider 37 positioned in the locking position restricts movement of the fixing releasing lever 12 together with the latch 14 in a predetermined movement direction (downward direction in the figure). That is, the locking mechanism 6 is in a locked state in which the operation of the fixing releasing lever 12 which is an operating portion is restricted.

On the other hand, as shown in part (b) of FIG. 6, when the plunger 11 is attracted by energization to the solenoid 10, the lock slider 37 is moved from the locking position to the lock releasing position. In this state, the lock slider 37 is retracted from movement loci of the fixing releasing lever 12 and the latch 14, and therefore, the operator is capable of moving the fixing releasing lever 12 from the fixing position (position of part (b) of FIG. 6) to the fixing releasing position (position of part (c) of FIG. 6) by operating the fixing releasing lever 12. In other words, the lock slider 37 positioned in the lock-releasing position permits movement of the fixing releasing lever 12 together with the latch 14 in a predetermined movement direction (downward direction in the figure). That is, the locking mechanism 6 is in the lock-released state in which the operation of the cartridge fixing lever 3 which is the operating portion is permitted.

When the fixing releasing lever 12 is moved to the fixing-releasing position as shown in part (c) of FIG. 6, by the above-described urging force of the cartridge pushing-out spring 17, the toner cartridge 1 is automatically moved in the dismounting direction D1. That is, in this embodiment, operations of both the lock release and the dismounting of the toner cartridge 1 is realized by one action such that the operator operates the fixing releasing lever 12. When the operator releases his (her) hand(s) from the fixing releasing lever 12, the fixing releasing lever 12 is returned to the fixing position by the urging force of the lever urging spring 13.

Thus, a new constitution capable of restricting dismounting of the cartridge can be provided by the locking mechanism 6 including the latch engaging portion 1A (portion-to-be-locked), the latch 14 (locking portion), the fixing releasing lever 12 (operating portion), the lock slider 37 (restricting member) and the solenoid 10 (actuator).

Further, also in this embodiment, the plurality of locking mechanisms 6 are provided correspondingly to the plurality of toner cartridges 1, and the solenoids 10 are controlled, so that each of the locking mechanisms 6 can be independently switched between the locked state and the lock-released state. Accordingly, by a control method similar to the control method described in the embodiment 1, while only the toner cartridge required to be exchanged is made exchangeable by releasing the lock of the locking mechanism 6, it is possible to prevent exchange of other toner cartridges.

That is, also by this embodiment, by a simple constitution, dismounting of the plurality of cartridges can be individually restricted.

Further, similarly as in the embodiment 1, in the locked state of the locking mechanism 6, the fixing releasing lever 12 which is the operating portion is in an inoperable state, and therefore, the operator is capable of easily grasping that the associated toner cartridge cannot be dismounted.

Embodiment 3

Next, an embodiment 3 will be described. This embodiment is different from the embodiment 1 in details of the constitution relating to mounting and dismounting of the toner cartridge. In the following, elements to which reference numerals or symbols common to the embodiments 1 and 2 are added have substantially the same constitutions and functions as those described in the embodiment 1 unless otherwise specified, and a portion different from the embodiment 1 will be principally described.

Parts (a) to (c) of FIG. 7 are perspective views of the contact mounting portion in this embodiment. Part (a) of FIG. 7 shows a state in which the toner cartridge 1 is mounted in a predetermined mounting position in the apparatus main assembly 100B and is locked by a locking mechanism 6 described later. Part (b) of FIG. 7 shows a state in which the toner cartridge 1 is positioned in the predetermined mounting position and lock of the locking mechanism 6 is released. Part (c) of FIG. 7 shows a state in which the toner cartridge 1 is being dismounting from the mounting position.

In this embodiment on a solenoid plate of the apparatus main assembly 100B with respect to the dismounting direction D1, i.e., on a side surface of the apparatus on the front side, a fixing releasing lever 12 is position. That is, different from the embodiment 2, the fixing releasing lever 12 in this embodiment is provided in the apparatus main assembly 100B.

The fixing releasing lever 12 is a member operated by the operator for switching the locking member between a locked state in which the dismounting of the toner cartridge 1 is restricted and a lock-released state in which the dismounting of the toner cartridge 1 is permitted. That is, the fixing releasing lever 12 is an example of an operating portion manually operated when the toner cartridge 1 is dismounted from the apparatus main assembly 100B. The controller 50 of the image forming apparatus 100 discriminates that there is no need to exchange the toner cartridge 1, the operation of the fixing releasing lever 12 is restricted and the cartridge fixing lever 3 becomes inoperable.

Further, in this embodiment, in the apparatus main assembly 100B, a pushing-out spring 17 as a pushing-out means for pushing out the toner cartridge 1 to an outside of the apparatus main assembly 100B.

When the fixing releasing lever 12 is in a fixing position shown in part (a) of FIG. 5, the locking member 6 becomes the locked state, so that the movement of the toner cartridge 1 in the dismount direction D1 is restricted. In this case, the toner cartridge 1 remains in the mounting position against the urging force of the cartridge pushing-out spring 17.

On the other hand, when the fixing releasing lever 12 in moved to a fixing-locked position shown in part (b) of FIG. 7, the locking member 6 becomes the lock-released state, so that the movement of the toner cartridge 1 in the dismounting direction D1 is permitted. In this case, as shown in part (c) of FIG. 7, in accordance with the urging force of the cartridge pushing-out spring 17, the toner cartridge 1 is moved from the mounting position in the dismounting direction D1 and is pushed out toward the outside of the apparatus main assembly 100B.

The locking mechanism 6 as a dismounting restricting means in this embodiment will be described using parts (a) to (c) of FIG. 7 and parts (a) and (b) of FIG. 8. The locking mechanism 6 is provided correspondingly to each of the toner cartridge 1Y to 1K, similarly as in the embodiment 1. In the following, the locking mechanism 6 corresponding to an arbitrary one of the toner cartridges 1Y to 1K will be described, but the locking mechanisms 6 corresponding to other toner cartridges have substantially the same constitution.

In this embodiment, the locking mechanism 6 is disposed at an upper edge portion of a dismounting opening for the toner cartridge 1 in the apparatus main assembly 100B (parts (a) to (c) of FIG. 7).

Parts (a) to (c) of FIG. 8 are sectional views of the locking mechanism 6 as viewed from an upstream of the dismounting direction D1 in a direction toward a V-V cross section shown in part (a) of FIG. 7. Part (a) of FIG. 8 shows the locked state of the locking mechanism 6. Part (b) of FIG. 8 shows the lock-released state of the locking mechanism 6.

As shown in part (a) of FIG. 8, the locking mechanism 6 in this embodiment includes the fixing releasing lever 12, the lever urging spring 13, a recessed cartridge portion 19, a projected lever portion 18, the locking arm 7, the arm urging spring 9, and the solenoid 10. Of these, the recessed cartridge portion 19 is provided on the toner cartridge 1. The fixing releasing lever 12, the lever urging spring 13, the projected lever portion 18, the locking arm 7, the arm urging spring 9, and the solenoid 10 are provided on the frame of the apparatus main assembly 100B. That is, the fixing releasing lever 12, the lever urging spring 13, the projected lever portion 18, the locking arm 7, the arm urging spring 9, and the solenoid 10 are provided in the apparatus main assembly 100B.

The fixing releasing lever 12 is provided slidably relative to the apparatus main assembly 100B in a direction crossing the dismounting direction D1, particularly the up-down direction in this embodiment. The fixing releasing lever 12 includes a gripping portion 12*b* gripped by the operator. In the case where the gripping portion 12*b* is viewed from the downstream of the dismounting direction D1 in a state in which the front door 2 is open, the gripping portion 12*b* is exposed to an outside of the frame of the toner cartridge 1.

The lever urging spring 13 is a compression spring connected to the fixing releasing lever 12 and the frame of the toner cartridge 1. The lever urging spring 13 urges the fixing releasing lever 12 toward the fixing position, i.e., upward.

The recessed cartridge portion 19 is a portion (portion-to-be-engaged) locked by the projected lever portion 18 as a locking portion. The recessed cartridge portion 19 has a recessed shape such that a part of an upper surface of the frame of the toner cartridge 1 is recessed downward.

The projected lever portion 18 has a projected shape such that the projected lever portion 18 is projected downward from a part of the fixing releasing lever 12 so as to be engageable with the recessed cartridge portion 19. The projected lever portion 18 is movable to a position (locking position, part (a) of FIG. 8) where the projected lever portion 18 overlaps with a wall surface of the recessed cartridge portion 19 as viewed in the dismounting direction D1 and a position (lock-released position, part (b) of FIG. 8) where the projected lever portion 18 does not overlap with the wall surface of the recessed cartridge portion 19 as viewed in the dismounting direction D1.

The locking arm 7 is provided rotatably about a rotation shaft 8 fixed to the side plate of the apparatus main assembly 100B. The locking arm 7 is movable between a locking position (part (a) of FIG. 8) where movement of the fixing releasing lever 12 from the fixing position to the fixing releasing position is restricted and a lock releasing position (part (b) of FIG. 8) where the movement of the fixing releasing lever 12 from the fixing position to the fixing releasing position is permitted. The locking arm 7 functions as a restricting member movable to a first position (locking position) where disengagement of the portion-to-be-locked (recessed cartridge portion 19) from the locking portion (projected lever portion 18) is restricted and a second position (lock releasing position) where the disengagement of the portion-to-be-locked from the locking portion is permitted.

The arm urging spring 9 is an urging member for urging the locking arm 7 toward the locking position. The arm urging spring 9 is a torsion coil spring mounted around the rotation shaft 8.

The solenoid 10 attracts a plunger 11 by a magnetic field generated by energization. The plunger 11 is rotatably connected to the locking arm 7. When the plunger 11 is attracted to the solenoid 10, the locking arm 7 moves from the locking position to the lock releasing position against an urging force of the arm urging spring 9. When the plunger 11 is released from the solenoid 10, the locking arm 7 moves from the lock releasing position to the locking position in accordance with the urging force of the arm urging spring 9. That is, the solenoid 10 functions as an actuator for moving the locking arm 7 between the locking position and the lock releasing position.

As shown in part (a) of FIG. 8, in the case where the energization to the solenoid 10 is not made, the locking arm 7 is held in the locking position. In this state, even when the operator intends to move the fixing releasing lever 12 from the fixing position to the fixing releasing position, a contact portion 12*a* of the fixing releasing lever 12 interferes with the locking arm 7, and therefore, the operator cannot operate the cartridge fixing lever 3. That is, the locking mechanism 6 is in a locked state in which the operation of the fixing releasing lever 12 which is an operating portion is restricted.

On the other hand, as shown in part (b) of FIG. 8, when the plunger 11 is attracted by energization to the solenoid 10, the locking arm 7 is moved from the locking position to the lock releasing position. In this state, the locking arm 7 is retracted from a movement locus of the contact portion 12*a*, and therefore, the operator is capable of moving the fixing releasing lever 12 from the fixing position (position of part (a) of FIG. 8) to the fixing releasing position (position of part (b) of FIG. 8) by operating fixing releasing lever 12. That is, the locking mechanism 6 is in the lock-released state in which the operation of the fixing releasing lever 12 which is the operating portion is permitted.

Thus, a new constitution capable of restricting dismounting of the cartridge can be provided by the locking mechanism 6 including the recessed cartridge portion 19 (portion-to-be-locked), the projected lever portion 18 (locking portion), the fixing releasing lever 12 (operating portion), the locking arm 7 (restricting member) and the solenoid 10 (actuator).

Further, also in this embodiment, the plurality of locking mechanisms 6 are provided correspondingly to the plurality of toner cartridges 1, and the solenoids 10 are controlled, so that each of the locking mechanisms 6 can be independently switched between the locked state and the lock-released state. Accordingly, by a control method similar to the control method described in the embodiment 1, while only the toner cartridge required to be exchanged is made exchangeable by releasing the lock of the locking mechanism 6, it is possible to prevent exchange of other toner cartridges.

That is, also by this embodiment, by a simple constitution, dismounting of the plurality of cartridges can be individually restricted.

Further, similarly as in the embodiments 1 and 2, in the locked state of the locking mechanism 6, the fixing releasing lever 12 which is the operating portion is in an inoperable state, and therefore, the operator is capable of easily grasping that the associated toner cartridge cannot be dismounted.

Further, in this embodiment, the fixing releasing lever 12 which is the operating portion is disposed in the apparatus main assembly 100B, and therefore, compared with the embodiments 1 and 2, the number of component parts of the toner cartridge 1 can be reduced.

That is, a constitution of the toner cartridge 1 which is a consumable is made similar, so that the toner cartridge 1 can be provided inexpensively.

Incidentally, the recessed cartridge portion 19 and the projected lever portion 18 may be disposed at a portion (lower surface portion or a side surface portion) other than the upper surface portion of the toner cartridge 1. Further, in this embodiment, the constitution in which the portion-to-be-locked has the recessed shape and the locking portion has the projected shape was described as an example, but a constitution in which the portion-to-be-locked has the projected shape and the locking portion has the recessed shape may be employed.

Embodiment 4

Next, an embodiment 4 will be described. This embodiment is different from the embodiment 1 in details of the constitution relating to mounting and dismounting of the toner cartridge. In the following, elements to which reference numerals or symbols common to the embodiments 1 and 2 are added have substantially the same constitutions and functions as those described in the embodiment 1 unless otherwise specified, and a portion different from the embodiment 1 will be principally described.

Parts (a) to (c) of FIG. 9 are sectional views each showing a part of a cartridge mounting portion on a rear side (opposite side to a downstream of the dismounting direction D1) in this embodiment. In this embodiment, the locking mechanism 6 for restricting the dismounting of the toner cartridge 1 is disposed on the rear side of the toner cartridge 1.

Part (a) of FIG. 9 shows the locked state of the locking mechanism 6. Part (b) of FIG. 9 shows not only the lock-released state of the locking mechanism 6 but also a state in which the toner cartridge 1 remains in the main mounting position. Part (c) of FIG. 9 shows not only the lock-released state of the locking mechanism 6 but also a state in which the toner cartridge 1 is being dismounted from the mounting position.

As shown in part (a) of FIG. 9, the locking mechanism 6 in this embodiment includes a toggle arm 20, a toggle urging spring 21, an arm engaging portion 23, the locking arm 7, the arm urging spring 9, and the solenoid 10. Of these, the arm engaging portion 23 is provided on the toner cartridge 1. The toggle arm 20, the toggle urging spring 21, the locking arm 7, the arm urging spring 9, and the solenoid 10 are provided in the apparatus main assembly 100B.

The arm engaging portion 23 is a portion (portion-to-be-engaged) to be engaged by the toggle arm 20 as a pulling-in member. The arm engaging portion 23 in this embodiment is a part of the frame of the toner cartridge 1 and is a hook-shaped projection projected rearward from a rear-side surface (side surface on an upstream side of the dismounting direction D1, rear surface) of the toner cartridge 1.

The toggle arm 20 is provided rotatably about a rotation shaft 22 fixed to the frame of the apparatus main assembly 100B. The toggle arm 20 is an arm member rotatable between a first angle (attitude of parts (a) and (b) of FIG. 9) at which the toggle arm 20 engages with the arm engaging portion 23 and a second angle (attitude of part (c) of FIG. 9) at which the toggle arm 20 is disengaged from the arm engaging portion 23.

The toggle urging spring 21 is a spring member for urging the toggle arm 20. The toggle arm 20 is disposed so that a direction in which the toggle arm 20 is urged changes with a predetermined angle between the first angle and the second angle of the toggle arm 20 as a boundary. That is, in the case where the toggle arm 20 is in an attitude close to the first angle than the predetermined angle is, the toggle urging spring 21 urges the toggle arm 20 toward the first angle. On the other hand, in the case where the toggle arm 20 is in an attitude close to the second angle than the predetermined angle is, the toggle urging spring 21 urges the toggle arm 20 toward the second angle. That is, the toggle arm 20 and the toggle urging spring 21 constitute a toggle mechanism (a supporting point exceeding mechanism) with the first angle and the second angle as stabilizing points.

The locking arm 7 is provided rotatably about a rotation shaft 8 fixed to the frame of the apparatus main assembly 100B. The locking arm 7 is movable between a locking position (part (a) of FIG. 9) where movement of the toggle arm 20 from the first angle to the second angle is restricted and a lock releasing position (part (b) of FIG. 9) where the movement of the toggle arm 20 from the first angle to the second angle is restricted. The locking arm 7 functions as a restricting member movable to a first position (locking position) where release of an engagement state between the portion-to-be-engaged (arm urging portion 23) and the pulling-in member (toggle arm 20) is restricted and a second position (lock releasing position) where the release of the engagement between the portion-to-be-engaged and the pulling-in member is permitted.

The arm urging spring 9 is an urging member for urging the locking arm 7 toward the locking position. The arm urging spring 9 is a torsion coil spring mounted around the rotation shaft 8.

The solenoid 10 attracts a plunger 11 by a magnetic field generated by energization. The plunger 11 is rotatably connected to the locking arm 7. When the plunger 11 is attracted to the solenoid 10, the locking arm 7 moves from the locking position to the lock releasing position against an urging force of the arm urging spring 9. When the plunger 11 is released from the solenoid 10, the locking arm 7 moves from the lock releasing position to the locking position in accordance with the urging force of the arm urging spring 9. That is, the solenoid 10 functions as an actuator for moving the locking arm 7 between the locking position and the lock releasing position.

As shown in part (a) of FIG. 9, in the case where the energization to the solenoid 10 is not made, the locking arm 7 is held in the locking position. In this state, movement of the toggle arm 20 from the first angle to the second angle is restricted, and therefore, even when the operator intends to move the toner cartridge 1 in the dismounting direction D1 by gripping the toner cartridge 1, the arm engaging portion 23 is locked by the toggle arm 20, so that the toner cartridge 1 is not moved. That is, the locking mechanism 6 is in a locking state in which the locking mechanism 6 locks the toggle arm 20 at the first angle at which the toner cartridge 1 is capable of being locked.

On the other hand, as shown in part (b) of FIG. 9, when the plunger 11 is attracted by energization to the solenoid 10, the locking arm 7 is moved from the locking position to the lock releasing position. In this state, the locking arm 7 is retracted from a rotation locus of the toggle arm 20, and therefore, the rotation of the toggle arm 20 from the first angle to the second angle is not prevented.

Then, as shown in part (c) of FIG. 9, when the operator moves the toner cartridge 1 in the dismounting direction D1 by gripping the toner cartridge 1, the toggle arm 20 is rotated from the first angle to the second angle with the movement of the toner cartridge 1.

Here, during insertion of a new toner cartridge 1 into the mounting direction D2 after the toner cartridge 1 to be exchanged is dismounted, the arm engaging portion 23 contacts the toggle arm 20, so that the toggle arm 20 starts rotation thereof from the second angle toward the first angle. Then, when the toggle arm 20 exceeds the predetermined angle, an urging direction of the toggle urging spring 21 changes, so that the toggle arm 20 is urged toward the first angle. As a result, the toggle arm 20 presses the arm engaging portion 23 leftward in part (c) of FIG. 9, so that a force for pulling-in the toner cartridge 1 toward the mounting position in the apparatus main assembly 100B acts on the toner cartridge 1. That is, a constitution in which the toggle arm 20 pulls in the toner cartridge 1 toward an inside of the apparatus main assembly 100B by the urging force of the toggle urging spring 21 in a process in which the toner cartridge 1 is mounted in the apparatus main assembly 100B is employed.

Thus, the locking mechanism 6 in this embodiment has a function of assisting mounting of the toner cartridge 1 by pulling the toner cartridge 1 into the apparatus main assembly 100B during the mounting of the toner cartridge 1 in addition to the function of restricting the dismounting of the toner cartridge 1. That is, it is possible to provide a new constitution capable of restricting the dismounting of the cartridge by the locking mechanism 6 including the arm engaging portion 23 (portion-to-be-engaged), the toggle arm 20 (pulling-in member), the locking arm 7 (restricting member), and the solenoid 10 (actuator).

Further, also in this embodiment, the plurality of locking mechanisms 6 are provided correspondingly to the plurality of toner cartridges 1, and the solenoids 10 are controlled, so that each of the locking mechanisms 6 can be independently switched between the locked state and the lock-released state. Accordingly, by a control method similar to the control method described in the embodiment 1, while only the toner cartridge required to be exchanged is made exchangeable by releasing the lock of the locking mechanism 6, it is possible to prevent exchange of other toner cartridges.

That is, also by this embodiment, by a simple constitution, dismounting of the plurality of cartridges can be individually restricted.

Further, the function of restricting the dismounting of the cartridge is added to the toggle mechanism for pulling the cartridge into the apparatus main assembly by adding the solenoid 10, the locking arm 7, and the like to the toggle mechanism, so that by a simpler constitution, it is possible to realize that dismounting of the plurality of cartridges is individually restricted.

Embodiment 5

Next, an embodiment 5 will be described. This embodiment is different from the embodiment 1 in details of the constitution relating to mounting and dismounting of the toner cartridge. In the following, elements to which reference numerals or symbols common to the embodiments 1 and 2 are added have substantially the same constitutions and functions as those described in the embodiment 1 unless otherwise specified, and a portion different from the embodiment 1 will be principally described.

Parts (a) to (c) of FIG. 5 are perspective views of the contact mounting portion in this embodiment. Part (a) of FIG. 5 shows a state in which the toner cartridge 1 is mounted in a predetermined mounting position in the apparatus main assembly 100B and is locked by a locking mechanism 6 described later. Part (b) of FIG. 5 shows a state in which the toner cartridge 1 is positioned in the predetermined mounting position and lock of the locking mechanism 6 is released. Part (c) of FIG. 5 shows a state in which a guide cover 5 is dismounted from a cartridge guide 4 in a state in which the toner cartridge is dismounted.

In this embodiment on a solenoid surface of the toner cartridge 1 with respect to the dismounting direction D1, i.e., on a side surface of the apparatus on the front side, a fixing releasing lever 12 is position. The fixing releasing lever 12 is a member operated by the operator for switching the locking member between a locked state in which the dismounting of the toner cartridge 1 is restricted and a lock-released state in which the dismounting of the toner cartridge 1 is permitted. That is, the fixing releasing lever 12 is an example of an operating portion manually operated when the toner cartridge 1 is dismounted from the apparatus main assembly 100B. The controller 50 of the image forming apparatus 100 discriminates that there is no need to exchange the toner cartridge 1, the operation of the fixing releasing lever 12 is restricted and the cartridge fixing lever 3 becomes inoperable.

Further, in the apparatus main assembly 100B, a pushing-out spring 17 as a pushing-out means for pushing out the toner cartridge 1 to an outside of the apparatus main assembly 100B. The cartridge pushing-out spring 17 urges the toner cartridge 1, mounted in the apparatus main assembly 100B, in the dismounting direction D1.

When the fixing releasing lever 12 is in a fixing position shown in part (a) of FIG. 5, the locking member 6 becomes the locked state, so that the movement of the toner cartridge 1 in the dismount direction D1 is restricted. In this case, the toner cartridge 1 remains in the mounting position against the urging force of the cartridge pushing-out spring 17.

On the other hand, when the fixing releasing lever 12 in moved to a fixing-locked position shown in part (b) of FIG. 5, the locking member 6 becomes the lock-released state, so that the movement of the toner cartridge 1 in the dismounting direction D1 is permitted. In this case, in accordance with the urging force of the cartridge pushing-out spring 17, the toner cartridge 1 is moved from the mounting position in the dismounting direction D1 and is pushed out toward the outside of the apparatus main assembly 100B.

Part (c) of FIG. 5 is a schematic view showing the locking mechanism as a dismounting restricting means for restricting the dismounting of the toner cartridge 1. At least a part of the locking mechanism 6 is accommodated in a locking mechanism accommodating portion 4*s* recessed downward from the supporting surface 4*b* in the cartridge guide 4 and is covered with a guide cover 5 from above. The guide cover 5 in this embodiment is positioned at an end portion of the supporting surface 4*b* of the cartridge guide 4 on one side of the supporting surface 4*b* as viewed from a downstream of the dismounting direction D1.

The locking mechanism 6 as a dismounting restricting means in this embodiment will be described using parts (a) to (c) of FIG. 6. The locking mechanism 6 is provided correspondingly to each of the toner cartridge 1Y to 1K, similarly as in the embodiment 1. In the following, the locking mechanism 6 corresponding to an arbitrary one of the toner cartridges 1Y to 1K will be described, but the locking mechanisms 6 corresponding to other toner cartridges have substantially the same constitution.

Parts (a) to (c) of FIG. 6 are sectional views of details of the locking mechanism 6 as viewed in a direction toward a V-V cross section shown in part (c) of FIG. 5. Part (a) of FIG. 6 shows the locked state of the locking mechanism 6. Part (b) of FIG. 6 shows not only the lock-released state of the locking mechanism 6 but also a state in which the cartridge fixing lever 3 is positioned in the fixing position. Part (c) of FIG. 6 shows not only the lock-released state of the locking mechanism 6 but also a state in which the cartridge fixing lever 3 is positioned in the fixing releasing position.

As shown in part (a) of FIG. 6, the locking mechanism 6 in this embodiment includes fixing releasing lever 12, a lever urging spring 13, a latch engaging portion 1A, a latch 14, a latch urging spring 15, a lock slider 37, a slider urging spring 39, and a solenoid 10. The fixing releasing lever 12, the lever urging spring 13, and the latch engaging portion 1A are provided on the toner cartridge 1. The latch 14, the latch urging spring 15, the lock slider 37, the slider urging spring 39, and the solenoid 10 are mounted in the cartridge guide 4. That is, the latch urging spring 15, the lock slider 37, the slider urging spring 39, and the solenoid 10 are provided in the apparatus main assembly 100B.

The fixing releasing lever 12 is provided slidably relative to a frame of the toner cartridge 1 in a direction crossing the dismounting direction D1, particularly the up-down direction in this embodiment. The fixing releasing lever 12 includes a gripping portion 12*b* gripped by the operator. In the case where the gripping portion 12*b* is viewed from the downstream of the dismounting direction D1 in a state in which the front door 2 is open, the gripping portion 12*b* is exposed to an outside of the frame of the toner cartridge 1 through a window portion 1*w* provided on the frame of the toner cartridge 1.

The lever urging spring 13 is connected to the fixing releasing lever 12 and the frame of the toner cartridge 1. The lever urging spring 13 urges the fixing releasing lever 12 toward the fixing position, i.e., upward.

The latch engaging portion 1A is a portion (portion-to-be-engaged) locked by the latch 14 as a locking portion. The latch engaging portion 1A is a part of the frame of the toner cartridge 1 and is a surface facing a downstream of the dismounting direction D1.

Parts (a) to (c) of FIG. 10 are sectional views of the toner cartridge 1 and the cartridge mounting portion in this embodiment. Part (a) of FIG. 10 shows a state in which upward movement of the toner cartridge 1 is restricted by the locking mechanism 6. Part (b) of FIG. 10 shows a state in which lock of the toner cartridge 1 by the locking mechanism 6 is released and in which the toner cartridge 1 remains in the mounting position. Part (c) of FIG. 10 shows a state in which the lock of the toner cartridge 1 by the locking mechanism 6 is released and in which the toner cartridge 1 is raised from the mounting position.

As shown in part (a) of FIG. 10, the locking mechanism 6 in this embodiment includes a projected cartridge portion 48, a recessed guiding portion 49, the locking arm 7, the arm urging spring 9, and the solenoid 10. Of these, the projected cartridge portion 48 is provided on the toner cartridge 1. The recessed guiding portion 49, the locking arm 7, the arm urging spring 9, and the solenoid 10 are provided on the cartridge guide 4 or the frame of the apparatus main assembly 100B. That is, the recessed guiding portion 49, the locking arm 7, the arm urging spring 9, and the solenoid 10 are provided in the apparatus main assembly 100B.

The projected cartridge portion 48 is a portion (portion-to-be-engaged) locked by the recessed guiding portion 48 as a locking portion. The projected cartridge portion 49 has a projected portion such that a part of a lower surface of the frame of the toner cartridge 1 is projected downward.

The recessed guiding portion 49 is a recessed portion with which the projected cartridge portion 48 is engageable and which is provided in a position corresponding to the projected cartridge portion 48 in the cartridge guide 4. The recessed guiding portion 49 is recessed downward from the supporting surface 4*b* of the cartridge guide 4.

The projected cartridge portion 48 is disengaged from the recessed guiding portion 49 by raising the toner cartridge 1. That is, the projected cartridge portion 48 is constituted so as to be disengaged from the recessed guiding portion 49 in the case where the toner cartridge is moved in a predetermined direction (arrow D3 direction) crossing the dismounting direction D1 when the toner cartridge 1 is dismounted from the apparatus main assembly 100B.

The locking arm 7 is provided rotatably about a rotation shaft 8 fixed to the frame of the apparatus main assembly 100B. The locking arm 7 is movable between a locking position (part (a) of FIG. 10) where raising of the toner cartridge 1 is restricted and a lock releasing position (parts (b) and (c) of FIG. 10) where the movement of the fixing releasing lever 12 from the fixing position to the fixing releasing position is permitted. The locking arm 7 functions as a restricting member movable to a first position (locking position) where disengagement of the portion-to-be-locked (projected cartridge portion 48) from the locking portion (recessed guiding portion 49) is restricted and a second position (lock releasing position) where the disengagement of the portion-to-be-locked from the locking portion is permitted.

The arm urging spring 9 is an urging member for urging the locking arm 7 toward the locking position. The arm urging spring 9 is a torsion coil spring mounted around the rotation shaft 8.

The solenoid 10 attracts a plunger 11 by a magnetic field generated by energization. The plunger 11 is rotatably connected to the locking arm 7. When the plunger 11 is attracted to the solenoid 10, the locking arm 7 moves from the locking position to the lock releasing position against an urging force of the arm urging spring 9. When the plunger 11 is released from the solenoid 10, the locking arm 7 moves from the lock releasing position to the locking position in accordance with the urging force of the arm urging spring 9. That is, the solenoid 10 functions as an actuator for moving the locking arm 7 between the locking position and the lock releasing position.

Further, in this embodiment, in the apparatus main assembly 100B, a cartridge pushing-out spring 17 for pushing the toner cartridge 1 to an outside of the apparatus main assembly 100B is provided.

As shown in part (a) of FIG. 10, in the case where the energization to the solenoid 10 is not made, the locking arm 7 is held in the locking position. In this state, even when the operator intends to raise the toner cartridge 1, the upper surface of the toner cartridge 1 interferes with the locking arm 7, and therefore, the operator cannot raise the toner cartridge. That is, the locking mechanism 6 is in a locked state in which the operation of moving the toner cartridge 1 in a predetermined direction is restricted.

On the other hand, as shown in part (b) of FIG. 10, when the plunger 11 is attracted by energization to the solenoid 10, the locking arm 7 is moved from the locking position to the lock releasing position. In this state, the locking arm 7 is retracted upward from a movement locus compared with the locking position, and therefore, the operator is capable of raising the toner cartridge 1. That is, the locking mechanism 6 is in the lock-released state in which the operation of moving the toner cartridge 1 in the predetermined direction.

Then, as shown in part (c) of FIG. 10, when the toner cartridge 1 is raised, the projected cartridge portion 48 is disengaged from the recessed guiding portion 49. Then, in accordance with the urging force of the cartridge pushing-out spring 17, the toner cartridge 1 is moved from the mounting position in the dismounting direction D1 and is pushed out toward the outside of the apparatus main assembly 100B.

Thus, a new constitution capable of restricting dismounting of the cartridge can be provided by the locking mechanism 6 including the projected cartridge portion 48 (portion-to-be-locked), the recessed guiding portion 49 (locking portion), the locking arm 7 (restricting member) and the solenoid 10 (actuator).

Further, also in this embodiment, the plurality of locking mechanisms 6 are provided correspondingly to the plurality of toner cartridges 1, and the solenoids 10 are controlled, so that each of the locking mechanisms 6 can be independently switched between the locked state and the lock-released state. Accordingly, by a control method similar to the control method described in the embodiment 1, while only the toner cartridge required to be exchanged is made exchangeable by releasing the lock of the locking mechanism 6, it is possible to prevent exchange of other toner cartridges.

That is, also by this embodiment, by a simple constitution, dismounting of the plurality of cartridges can be individually restricted.

Further, in the locked state of the locking mechanism 6, the movement operation of the toner cartridge 1 in the predetermined direction is in an inoperable state, and therefore, the operator is capable of easily grasping that the associated toner cartridge cannot be dismounted.

Incidentally, in this embodiment, the case where the predetermined direction is the upward direction in the constitution in which when the toner cartridge 1 is dismounted, the toner cartridge 1 is moved in the predetermined direction crossing the dismounting direction D1 and then is pulled out in the dismounting direction D1 was described. The present invention is not limited thereto. A constitution in which the portion-to-be-locked of the toner cartridge 1 is disengaged from the locking portion of the apparatus main assembly 100B by moving the toner cartridge 1 in a direction (for example, a rightward direction or a leftward direction as viewed in the dismounting direction) crossing the dismounting direction may be employed.

Further, in this embodiment, the constitution in which the portion-to-be-locked has the projected shape and the locking portion has the recessed shape was described as an example, but a constitution in which the portion-to-be-locked has the recessed shape and the locking portion has the projected shape may be employed.

Embodiment 6

Next, an embodiment 6 will be described. This embodiment is different from the embodiment 1 in details of the constitution relating to mounting and dismounting of the toner cartridge. In the following, elements to which reference numerals or symbols common to the embodiments 1 and 2 are added have substantially the same constitutions and functions as those described in the embodiment 1 unless otherwise specified, and a portion different from the embodiment 1 will be principally described.

Parts (a) to (c) of FIG. 11 are perspective views each showing the contact mounting portion in this embodiment. Part (a) of FIG. 11 shows a state in which the toner cartridge 1 is mounted in a predetermined mounting position in the apparatus main assembly 100B and a handle cover 24 described later is closed. Part (b) of FIG. 11 shows a state in which the toner cartridge 1 is positioned in the mounting position and the handle cover 24 is opened. Part (c) of FIG. 11 shows a state in which the toner cartridge 1 is being dismounted from the mounting position.

In this embodiment, the apparatus main assembly 100B is provided with the handle cover 24 for restricting access of the toner cartridge 1 to a handle 25. The handle cover 24 is movable to a closed position (position of part (a) of FIG. 11) where the handle cover 24 covers an opening 25*o* (part (b) of FIG. 11) for permitting insertion of operator's hand in the handle 25 and an open position (position of part (b) of FIG. 11) where the opening 25*o* is exposed. The opening 25*o* is a space which is formed between the handle 25 and a peripheral edge of the opening 115 (FIG. 2) of the apparatus main assembly 100B through which the toner cartridge 1 passes when the toner cartridge 1 is mounted in and dismounted from the apparatus main assembly 100B and which permits the operator to insert his (her) hand(s) into the handle 25 from a downstream side of the dismounting direction. That is, the handle cover 24 functions as a restricting member (sliding member) movable to a first position (closed position) where access to a gripping portion (handle 25) is restricted by covering a part opening 25*o*) of the cartridge 1 is viewed from the downstream of the dismounting direction D1 and a second position (open position) where the access to the gripping portion is permitted by exposing a part of the toner cartridge 1.

The handle cover 24 is a plate-like member and is disposed so that an occupied area viewed from the downstream of the dismounting direction D1 in a state in which the handle cover 24 is positioned in the closed position is smaller than an occupied area viewed from the downstream of the dismounting direction D1.

In the cartridge mounting portion, a cover open/close mechanism 26 for moving the handle cover 24 between the closed position and the open position. In a state in which the handle cover 24 is moved to the open position as shown in part (b) of FIG. 11, the operator grips the handle 25 through the opening 25*o* and then pulls the handle 25 in the dismounting direction D1, so that the operator is capable of dismounting the toner cartridge 1 from the apparatus main assembly 100B as shown in part (c) of FIG. 11.

The cover open/close mechanism 26 is provided in four positions correspondingly to the plurality of toner cartridges 1Y to 1K, and restricts access of the associated toner cartridge to the handle 25. That is, the cover open/close mechanism 26 is an example of a plurality of dismounting restricting means provided correspondingly to the plurality of cartridges.

Parts (a) to (c) of FIG. 12 are sectional views each showing the cover open/close mechanism 26. part (a) of FIG. 12 shows a closed state (locked state) in which the cover open/close mechanism 26 holds the handle cover 24 in the closed position. Part (b) of FIG. 12 shows an open state (unlocked state) in which the cover open/close mechanism 26 moves the handle cover 24 to the open position. Part (c) of FIG. 12 shows a state in which the toner cartridge 1 is being pulled out in the dismounting direction D1.

The cover open/close mechanism 26 includes the handle cover 24, a cover urging spring 28, a cover open/close slider 29, and the solenoid 10. All the handle cover 24, the cover urging spring 28, the cover open/close slider 29, and the solenoid 10 are disposed in the apparatus main assembly 100B.

The locking arm 7 is provided rotatably about a rotation shaft 27 fixed to the frame of the apparatus main assembly 100B. The cover urging spring 28 urges the handle cover 24 toward the closed position. The cover open/close slider 29 is a torsion coil spring mounted around the rotation shaft 27.

The cover open/close slider 29 is a link member for connecting the handle device 24 and the plunger 11 driven by the solenoid 10.

The solenoid 10 attracts a plunger 11 by a magnetic field generated by energization. When the plunger 11 is attracted to the solenoid 10, the cover open/close slider 29 slides together with the plunger 11 and the handle cover 24 moves from the closed position to the open position against an urging force of the cover urging spring 28 (part (b) of FIG. 12). When the plunger 11 is released from the solenoid 10, the handle cover 24 moves from the open position to the closed position in accordance with the urging force of the cover urging spring 28, and the cover open/close slider 29 follows the handle cover 24 and moves (part (a) of FIG. 12). That is, the solenoid 10 functions as an actuator for moving the handle cover 24 between the closed position and the open position.

Further, in a state in which the handle cover 24 is positioned in the open position, as described above, the operator has access to the handle 25 through the opening 25*o* and is capable of pulling out the toner cartridge 1 in the dismounting direction D1 while gripping the handle 25.

Thus, a new constitution capable of restricting dismounting of the cartridge can be provided by the cover open/close mechanism 26 including the handle cover 24 portion-to-be-locked, and the solenoid 10 (actuator).

Further, also in this embodiment, the plurality of cover open/close mechanisms 26 are provided correspondingly to the plurality of toner cartridges 1, and the solenoids 10 are controlled, so that each of the cover open/close mechanisms 26 can be independently switched between the closed state and the open state. Accordingly, by a control method similar to the control method described in the embodiment 1, while only the toner cartridge required to be exchanged is made exchangeable by placing the cover open/close mechanism 26 in the open state, it is possible to prevent exchange of other toner cartridges.

That is, also by this embodiment, by a simple constitution, dismounting of the plurality of cartridges can be individually restricted.

Further, in this embodiment, the openings 25*o* of the toner cartridges other than the toner cartridge to be exchanged are covered with the handle covers 24 positioned in the closed position, and therefore, the operator is capable of visually recognizing that the associated toner cartridges cannot be dismounted.

Further, the handle cover 24 in this embodiment merely covers a part of the toner cartridge as viewed from the front side, and therefore, compared with the case where a door for covering entirety of the toner cartridge is provided, a mechanism for restricting the access to the handle 25 can be disposed in a space saving manner.

Embodiment 7

Next, an embodiment 7 will be described. This embodiment is different from the embodiment 1 in details of the constitution relating to mounting and dismounting of the toner cartridge. In the following, elements to which reference numerals or symbols common to the embodiments 1 and 2 are added have substantially the same constitutions and functions as those described in the embodiment 1 unless otherwise specified, and a portion different from the embodiment 1 will be principally described.

Parts (a) and (b) of FIG. 13 are perspective views of the contact mounting portion in this embodiment. Part (a) of FIG. 13 shows a state in which the toner cartridge 1 is mounted in a mounting position. Part (b) of FIG. 13 shows a state in which the toner cartridge 1 is being pulled out from the mounting position.

The toner cartridge 1 in this embodiment is a substantially cylindrical container (toner bottle). The toner cartridge 1 is constituted so as to discharge the toner contained therein by being rotated about an axis (center line of the cylindrical shape, rotational axis) with respect to a longitudinal direction in a state in which the toner cartridge 1 is mounted in the apparatus main assembly 100B. The toner cartridge 1 includes a handle 25 as a gripping portion, capable of being gripped by the operator, at a leading end thereof with respect to the dismounting direction D1.

As shown in parts (a) and (b) of FIG. 13, the cartridge mounting portion includes the cartridge guide 4 as the supporting member for supporting the toner cartridge 1 mounted in the apparatus main assembly 100B. The cartridge guide 4 is a thin and long member which has a C-character cross-section opening upward as viewed from the downstream of the dismounting direction D1 and which extends in the dismounting direction. Accordingly, the cartridge guide 4 functions as a guiding means for guiding the toner cartridge 1 when the toner cartridge 1 is moved in the dismounting direction D1 and the mounting direction D2 opposite to the dismounting direction D1.

Parts (a) and (b) of FIG. 14 are perspective views each showing the locking mechanism 6. Part (a) of FIG. 14 shows a locked state of the locking mechanism 6, and part (b) of FIG. 14 shows a lock-released state of the locking mechanism 6.

As shown in part (a) of FIG. 14, the locking mechanism 6 includes an annular groove 32, the locking arm 7, the arm urging spring 9, and the solenoid 10. The annular groove 32 is provided on the toner cartridge 1. The locking arm 7, the arm urging spring 9, and the solenoid 10 are provided in the apparatus main assembly 100B.

The annular groove 32 is a portion (portion-to-be-locked) locked by the locking arm 7 as the locking portion. The annular groove 32 is a groove such that a groove shape recessed from a cylindrical outer peripheral surface of the toner cartridge 1 about the rotational axis of the toner cartridge 1 toward an inside with respect to a radial direction is continuously formed in an annular shape with respect to a rotational direction (circumferential direction) of the toner cartridge 1. Incidentally, as the portion-to-be-locked, a portion such that a projected shape projecting from the outer peripheral surface of the toner cartridge 1 toward an outside in the radial direction is continuously formed in the annular shape with respect to the rotational direction (circumferential direction) of the toner cartridge 1 may be used.

The locking arm 7 is provided rotatably about a rotation shaft 8 fixed to the frame of the apparatus main assembly 100B. The locking arm 7 is movable between a locking position (position of part (a) of FIG. 14, engaging position, locked position) where the locking arm 7 engages with the annular groove 32 and a lock releasing position (position of part (b) of FIG. 14, disengaging position, non-locked position) where the locking arm 7 is disengaged from the annular groove 32. The locking arm 7 functions as a restricting member (locking member) movable to a first position (locking position) where the locking arm of the portion-to-be-locked and restricts dismounting of the cartridge and a second position (lock releasing position) where the cartridge is dismounted from the portion-to-be-locked.

Here, the annular groove 32 is formed in the annular shape at an outer peripheral portion of the toner cartridge 1, and therefore, even in the case where the toner cartridge 1 is rotated for supplying the toner, the locking arm does not obstruct a rotation operation of the toner cartridge 1.

The arm urging spring 9 is an urging member for urging the locking arm 7 toward the locking position. The arm urging spring 9 is a torsion coil spring mounted around the rotation shaft 8.

The solenoid 10 attracts a plunger 11 by a magnetic field generated by energization. The plunger 11 is rotatably connected to the locking arm 7. When the plunger 11 is attracted to the solenoid 10, the locking arm 7 moves from the locking position to the lock releasing position against an urging force of the arm urging spring 9. When the plunger 11 is released from the solenoid 10, the locking arm 7 moves from the lock releasing position to the locking position in accordance with the urging force of the arm urging spring 9. That is, the solenoid 10 functions as an actuator for moving the locking arm 7 between the locking position and the lock releasing position.

As described above, a new constitution capable of restricting dismounting of the cartridge can be provided by the locking mechanism 6 including the annular groove 32 (portion-to-be-locked), the locking arm 7 (restricting member), and the solenoid 10 (actuator).

Further, in this embodiment, the plurality of locking mechanisms 6 are provided correspondingly to the plurality of toner cartridges 1. Further, the controller 50 selectively controls the solenoid 10 (actuator) provided in each of the locking mechanisms 6. By this, while only the toner cartridge discriminated that the toner cartridge is required to be exchanged is made exchangeable by releasing the lock of the locking mechanism 6, it is possible to prevent exchange of other toner cartridges.

That is, also by this embodiment, by a simple constitution, dismounting of the plurality of cartridges can be individually restricted.

OTHER EMBODIMENTS

In the above-described embodiments, as an example of the plurality of toner cartridges each detachably mounted to the apparatus main assembly of the image forming apparatus, the toner cartridges accommodating the toners different in color from each other were described. However, the cartridges are not limited thereto, but for example, may be process cartridges PY, PM, PC and PK each constituted dismountably from the apparatus main assembly. Each of the process cartridges refers to a cartridge prepared by integrally assembling an image bearing member (electrophotographic photosensitive member) and one or more process member actable on the image bearing member, in order to execute respective steps of an electrostatic process, into a unit. Further, each of the cartridges may also be an image bearing member cartridge (drum cartridge) including the image bearing member, the charging device, and the cleaning device or a developing cartridge including a developing container and a developing roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-172826 filed on Oct. 22, 2021, which is hereby incorporated by reference herein in its entirety.

What is claimed is:

1. An image forming apparatus comprising:

(i) a cartridge including a portion-to-be-engaged;

(ii) a main assembly to which the cartridge is detachably mountable; and (iii) an operating member configured to be operated when the cartridge is disengaged from the main assembly, wherein the main assembly includes (iv) a cartridge disengagement restricting mechanism configured to restrict disengagement of the cartridge from the main assembly, the cartridge disengagement restricting mechanism including:

(iv-i) an engaging portion configured to engage with the portion-to-be-engaged of the cartridge so as to restrict movement of the cartridge in a disengaging direction in which the cartridge is disengaged from the main assembly;

(iv-ii) a restricting member movable between a first position where a releasing operation of the operating member for releasing engagement between the portion-to-be-engaged and the engaging portion is restricted and a second position where the releasing operation is allowed; and (iv-iii) an actuator configured to move the restricting member between the first position and the second position.

2. An image forming apparatus according to claim 1, wherein the operating member is provided on the cartridge.

3. An image forming apparatus according to claim 2, wherein the portion-to-be-engaged is provided on the operating member, and wherein the portion-to-be-engaged is moved with an operation of the operating member from an engaging position in which the portion-to-be-engaged of the operating member overlaps with the engaging portion as viewed in the disengaging direction to an engagement releasing position in which the portion-to-be-engaged of the operating member does not overlap with the engaging portion as viewed in the disengaging direction.

4. An image forming apparatus according to claim 3, wherein the operating member is rotatably supported by a frame of the cartridge and is configured to be rotated in a predetermined rotational direction in the operation thereof, and wherein the restricting member restricts rotation of the operating member in the predetermined rotational direction in a case that the restricting member is positioned in the first position and allows the rotation of the operating member in the predetermined rotational direction in a case that the restricting member is positioned in the second position.

5. An image forming apparatus according to claim 2, wherein the engaging portion is provided so as to be movable between an engaging position in which the engaging portion overlaps with the portion-to-be-engaged of the cartridge as viewed in the disengaging direction and an engagement releasing position in which the engaging portion does not overlap with the portion-to-be-engaged of the cartridge as viewed in the disengaging direction, and wherein in a case that an operation of the operating member is performed, the engaging portion is contacted to the operating member and is moved from the engaging position to the engagement releasing position.

6. An image forming apparatus according to claim 5, wherein the operating member is slidably supported by a frame of the cartridge, wherein the operating member is moved in a predetermined movement direction in the operation thereof, and wherein the restricting member restricts movement of the engaging portion in conjunction with the operating member in the predetermined movement direction in a case that the restricting member is positioned in the first position and allows the movement of the engaging portion in conjunction with the operating member in the predetermined movement direction in a case that the restricting member is positioned in the second position.

7. An image forming apparatus according to claim 1, wherein the operating member is provided in the main assembly.

8. An image forming apparatus according to claim 7, wherein the engaging portion is provided on the operating member, and wherein with an operation of the operating member, the engaging portion of the operating member is moved from an engaging position in which the engaging portion of the operating member overlaps with the portion-to-be-engaged of the cartridge as viewed in the disengaging direction to an engagement releasing position in which the engaging portion of the operating member does not overlap with the portion-to-be-engaged of the cartridge as viewed in the disengaging direction.

9. An image forming apparatus according to claim 8, wherein the portion-to-be-engaged of the cartridge has a recessed shape in which a frame of the cartridge is recessed in a direction crossing the disengaging direction, wherein the engaging portion of the operating member has a projected shape and engages in the recessed shape in a case that the engaging portion of the operating member is positioned in the engaging position and has a projected shape which disengages from the recessed shape in a case that the engaging portion is positioned in the disengagement releasing position, and wherein the restricting member restricts movement of the operating member in a direction in which the projected shape disengages from the recessed shape in a case that the restricting member is positioned in the first position and permits the movement of the operating member in the direction in which the projected shape disengages from the recessed shape in a case that the restricting portion member is positioned in the second position.

10. An image forming apparatus according to claim 1, further comprising a pushing-out mechanism configured to push out the cartridge in the disengaging direction, wherein the pushing-out mechanism pushes out the cartridge in the disengaging direction in a case that the engagement between the portion-to-be-engaged and the engaging portion is released.

11. An image forming apparatus according to claim 1, wherein the actuator is a solenoid.

12. An image forming apparatus comprising:

(i) a cartridge including a portion-to-be-engaged;

(ii) a main assembly to which the cartridge is mountable and from which the cartridge is disengageable, the main assembly including:

(ii-i) a pulling-in member configured to pull in the cartridge toward a mounting position, the pulling-in member being configured to engage with the portion-to-be-engaged of the cartridge while the cartridge is being mounted in the main assembly; and (ii-ii) a cartridge disengagement restricting mechanism configured to restrict disengagement of the cartridge from the main assembly, the cartridge disengagement restricting mechanism including:

(ii-ii-i) a restricting member movable between a first position where release of an engaging state between the portion-to-be-engaged of the cartridge and the pulling-in member is restricted and a second position where the release of the engaging state is allowed; and (ii-ii-ii) an actuator configured to move the restricting member between the first position and the second position.

13. An image forming apparatus according to claim 12, wherein the pulling-in member is rotatable between a first position where the pulling-in member holds the cartridge in the mounting position in engagement with the portion-to-be-engaged and a second position in which the pulling-in member is separated from the portion-to-be-engaged, and wherein the restricting member restricts rotation of the pulling-in member from the first position to the second position in a case that the restricting member is positioned in the first position and allows the rotation of the pulling-in member from the first position to the second position in a case that the restricting member is positioned in the second position.

14. An image forming apparatus according to claim 13, wherein the main assembly includes an elastic member configured to urge the pulling-in member so as to rotate from the first position to the second position.

15. An image forming apparatus comprising:

(i) a cartridge including a portion-to-be-engaged; and (ii) a main assembly to which the cartridge is mountable and from which the cartridge is disengageable, the main assembly including:

(ii-i) an engaging portion configured to engage with the portion-to-be-engaged of the cartridge, wherein movement of the cartridge from the main assembly in a disengaging direction is restricted in a state in which the engaging portion engages with the portion-to-be-engaged of the cartridge and is allowed by disengagement of the engaging portion from the portion-to-be-engaged of the cartridge in a case that the cartridge is moved in a predetermined direction crossing the disengaging direction; and (ii-ii) a cartridge disengagement restricting mechanism including:

(ii-ii-i) a restricting member movable to a first position where movement of the cartridge in the predetermined direction is restricted and a second position where the movement of the cartridge in the predetermined direction is allowed; and (ii-ii-ii) an actuator configured to move the restricting member between the first position and the second position.

16. An image forming apparatus according to claim 15, wherein one of the engaging portion and the portion-to-be-engaged is a recessed portion and the other is a projected portion, wherein the predetermined direction is a direction in which the projected portion is disengaged from the recessed portion, and wherein the restricting member restricts the movement of the cartridge in the predetermined direction in contact with an end surface of the cartridge with respect to the predetermined direction in a case that the restricting member is positioned in the first position and allows the movement of the cartridge in the predetermined direction in a case that the restricting member is positioned in the second position.

17. An image forming apparatus according to claim 15, wherein the main assembly includes a spring configured to push out the cartridge in the disengaging direction.

* * * * *